US007820977B2

(12) United States Patent
Beer et al.

(10) Patent No.: US 7,820,977 B2
(45) Date of Patent: Oct. 26, 2010

(54) METHODS AND APPARATUS FOR IMPROVED GAMMA SPECTRA GENERATION

(76) Inventors: Steve Beer, 15 Mark Twain Dr., Morristown, NJ (US) 07960; Dan Inbar, 22 D'Israeli St., Haifa (IL) 34334

( * ) Notice: Subject to any disclaimer, the term of this patent is extended or adjusted under 35 U.S.C. 154(b) by 432 days.

(21) Appl. No.: 11/690,150

(22) Filed: Mar. 23, 2007

(65) Prior Publication Data
US 2007/0187608 A1    Aug. 16, 2007

Related U.S. Application Data

(60) Provisional application No. 60/767,379, filed on Mar. 23, 2006.

(51) Int. Cl.
*G01T 1/20* (2006.01)
(52) U.S. Cl. .................................. 250/390.07
(58) Field of Classification Search ............ 250/390.01, 250/390.07, 390.08, 390.11
See application file for complete search history.

(56) References Cited

U.S. PATENT DOCUMENTS

| 2,950,393 A | 8/1960 | Southward |
| 3,076,895 A | 2/1963 | Baldwin |
| 3,381,131 A | 4/1968 | Meal et al. |
| 3,471,414 A | 10/1969 | Faler |
| 3,670,164 A | 6/1972 | Hardy et al. |
| 3,688,113 A | 8/1972 | Miraldi |
| 3,878,373 A | 4/1975 | Blum |
| 3,899,675 A | 8/1975 | Floyd |
| 3,919,557 A | 11/1975 | Berninger |
| 3,935,462 A | 1/1976 | de Luca et al. |
| 3,956,654 A | 5/1976 | Gleason |
| 3,960,756 A | 6/1976 | Noakes |
| 3,970,852 A | 7/1976 | Richey et al. |
| 3,978,337 A | 8/1976 | Nickles et al. |
| 3,988,585 A | 10/1976 | O'Neill et al. |
| 4,001,591 A | 1/1977 | Inbar |
| 4,021,670 A | 5/1977 | Noakes |
| 4,045,676 A | 8/1977 | Rolle |
| 4,060,730 A | 11/1977 | Zioni et al. |
| 4,095,108 A | 6/1978 | Inbar et al. |
| 4,100,413 A | 7/1978 | Inbar et al. |
| 4,117,330 A | 9/1978 | Lansiart et al. |

(Continued)

FOREIGN PATENT DOCUMENTS

CN    1405555    3/2003

(Continued)

OTHER PUBLICATIONS

Official Action Dated Dec. 10, 2009 From the US Patent and Trademark Office Re.: U.S. Appl. No. 11/463,112.

(Continued)

*Primary Examiner*—David P Porta
*Assistant Examiner*—Djura Malevic

(57) ABSTRACT

A method of improving energy determination of a Gamma event which interacts with a segmented scintillation detector, the method comprising: identifying radiation events detected by a detector that are likely not to have deposited their full energy in the detector, based only on characteristics of said detected events; and treating the identified radiation events differently from other radiation events that are likely to have deposited their full energy in the detector.

41 Claims, 9 Drawing Sheets

U.S. PATENT DOCUMENTS

| | | |
|---|---|---|
| 4,143,271 A | 3/1979 | Klein et al. |
| 4,149,079 A | 4/1979 | Ben-Zeev et al. |
| 4,179,664 A | 12/1979 | Bedwell |
| 4,180,736 A | 12/1979 | Goodman |
| 4,200,803 A | 4/1980 | Becker et al. |
| 4,217,497 A | 8/1980 | Daniels et al. |
| 4,243,886 A | 1/1981 | Untermyer, II |
| 4,262,203 A | 4/1981 | Overhoff |
| 4,278,885 A | 7/1981 | Von Alfthan et al. |
| 4,291,227 A | 9/1981 | Caldwell et al. |
| 4,322,617 A | 3/1982 | Parker |
| 4,343,994 A | 8/1982 | Farcy |
| 4,350,607 A | 9/1982 | Apfel |
| 4,358,682 A | 11/1982 | Telfer et al. |
| 4,369,495 A | 1/1983 | Inbar et al. |
| 4,393,307 A | 7/1983 | Nozaki et al. |
| 4,419,578 A | 12/1983 | Kress |
| 4,424,446 A | 1/1984 | Inbar et al. |
| 4,426,580 A | 1/1984 | Smith |
| 4,429,226 A | 1/1984 | Inbar |
| 4,432,059 A | 2/1984 | Inbar et al. |
| 4,434,373 A | 2/1984 | Christ et al. |
| 4,447,727 A | 5/1984 | Friesenhahn |
| 4,455,616 A | 6/1984 | Inbar |
| 4,476,391 A | 10/1984 | Bednarczyk |
| 4,481,421 A | 11/1984 | Young et al. |
| 4,493,811 A | 1/1985 | Seki et al. |
| 4,498,007 A | 2/1985 | Schwarzmann |
| 4,509,042 A | 4/1985 | Kruse |
| 4,543,485 A | 9/1985 | Ishii et al. |
| 4,568,510 A | 2/1986 | Caldwell |
| 4,573,122 A | 2/1986 | Inbar et al. |
| 4,580,057 A | 4/1986 | Sidhwa |
| 4,582,670 A | 4/1986 | Leon et al. |
| 4,588,897 A | 5/1986 | Inbar et al. |
| 4,588,898 A | 5/1986 | Piesch et al. |
| 4,598,202 A | 7/1986 | Koechner |
| 4,613,313 A | 9/1986 | Steele |
| 4,620,100 A | 10/1986 | Schoenig, Jr. et al. |
| 4,622,466 A | 11/1986 | Tamura |
| 4,638,158 A | 1/1987 | Sonne et al. |
| 4,731,535 A | 3/1988 | Rische et al. |
| 4,823,016 A * | 4/1989 | Yamashita et al. ..... 250/363.03 |
| 4,841,153 A * | 6/1989 | Wormald ............... 250/390.04 |
| 4,864,140 A * | 9/1989 | Rogers et al. ............... 250/369 |
| 4,866,277 A | 9/1989 | Johnson et al. |
| 4,870,280 A | 9/1989 | Yamashita et al. |
| 4,937,452 A | 6/1990 | Simpson et al. |
| 5,034,610 A | 7/1991 | Spacher et al. |
| 5,041,728 A | 8/1991 | Spacher et al. |
| 5,078,951 A | 1/1992 | August, Jr. |
| 5,083,026 A | 1/1992 | Elbaum |
| 5,155,366 A * | 10/1992 | Miller ........................ 250/368 |
| 5,204,527 A | 4/1993 | Buchanan |
| 5,315,506 A | 5/1994 | Wang et al. |
| 5,317,158 A | 5/1994 | McElhaney et al. |
| 5,326,974 A | 7/1994 | Karras et al. |
| 5,345,084 A | 9/1994 | Byrd |
| 5,440,135 A | 8/1995 | Shonka |
| 5,457,720 A | 10/1995 | Snyder et al. |
| 5,517,030 A | 5/1996 | Nabais Conde et al. |
| 5,532,122 A | 7/1996 | Drukier |
| 5,638,420 A | 6/1997 | Armistead |
| 5,675,151 A | 10/1997 | Oka et al. |
| 5,692,029 A | 11/1997 | Husseiny et al. |
| 5,721,759 A | 2/1998 | Raatikainen |
| 5,734,689 A | 3/1998 | Copeland et al. |
| 5,738,895 A | 4/1998 | Fuchs et al. |
| 5,753,919 A | 5/1998 | Prain et al. |
| 5,780,856 A | 7/1998 | Oka et al. |
| 5,821,541 A | 10/1998 | Tumer |
| 5,838,759 A | 11/1998 | Armistead |
| 5,854,489 A | 12/1998 | Verger et al. |
| 5,880,469 A | 3/1999 | Miller |
| RE36,201 E | 4/1999 | Miller |
| 6,006,162 A | 12/1999 | Haywood |
| 6,076,009 A | 6/2000 | Raylman et al. |
| 6,087,663 A * | 7/2000 | Moisan et al. ............... 250/367 |
| 6,111,257 A | 8/2000 | Shand et al. |
| 6,120,706 A | 9/2000 | Lessing et al. |
| 6,134,289 A | 10/2000 | Peurrung et al. |
| 6,149,593 A | 11/2000 | Gonzalez-Lepera |
| 6,169,285 B1 * | 1/2001 | Petrillo et al. ............... 250/369 |
| 6,175,120 B1 | 1/2001 | McGregor et al. |
| 6,184,531 B1 | 2/2001 | Smart et al. |
| 6,194,726 B1 | 2/2001 | Pi et al. |
| 6,201,257 B1 | 3/2001 | Stettner et al. |
| 6,201,530 B1 | 3/2001 | Thadani et al. |
| 6,225,634 B1 | 5/2001 | Atrashkevich et al. |
| 6,228,664 B1 | 5/2001 | Bronson et al. |
| 6,255,655 B1 | 7/2001 | Mc Croskey et al. |
| 6,255,657 B1 | 7/2001 | Cole et al. |
| 6,256,373 B1 | 7/2001 | Bernstein et al. |
| 6,271,510 B1 | 8/2001 | Boxen |
| 6,285,028 B1 | 9/2001 | Yamakawa |
| 6,297,506 B1 | 10/2001 | Young et al. |
| 6,298,113 B1 | 10/2001 | Duclos et al. |
| 6,300,635 B1 | 10/2001 | Brambilla et al. |
| 6,341,150 B1 | 1/2002 | Ivanov et al. |
| 6,362,477 B1 | 3/2002 | Sowerby et al. |
| 6,362,485 B1 | 3/2002 | Joyce et al. |
| 6,369,393 B1 | 4/2002 | Jordanov |
| 6,380,540 B1 | 4/2002 | Maor et al. |
| 6,380,541 B1 | 4/2002 | Laine et al. |
| 6,388,260 B1 | 5/2002 | Doty et al. |
| 6,420,710 B1 | 7/2002 | Verger et al. |
| 6,423,972 B1 | 7/2002 | Fehrenbacher et al. |
| 6,452,992 B1 | 9/2002 | Umiastowski |
| 6,456,869 B1 | 9/2002 | Raylman et al. |
| 6,486,486 B1 | 11/2002 | Lacy |
| 6,509,563 B1 | 1/2003 | McElroy, Jr. et al. |
| 6,519,306 B1 | 2/2003 | Matsumiya |
| 6,544,442 B1 | 4/2003 | Bell et al. |
| 6,596,998 B1 | 7/2003 | Siedel |
| 6,603,122 B2 | 8/2003 | Taleyarkhan |
| 6,603,124 B2 | 8/2003 | Maublant |
| 6,610,977 B2 | 8/2003 | Megerle |
| 6,624,415 B1 | 9/2003 | Hattori et al. |
| 6,723,996 B2 | 4/2004 | Lebrun et al. |
| 6,806,475 B1 | 10/2004 | Lightfoot et al. |
| 6,822,235 B2 | 11/2004 | Ryden |
| 6,876,711 B2 | 4/2005 | Wallace et al. |
| 6,906,559 B2 | 6/2005 | Tumer |
| 6,944,264 B2 | 9/2005 | Bijjani et al. |
| 6,989,541 B2 | 1/2006 | Penn |
| 6,992,313 B2 | 1/2006 | Piestrup |
| 7,026,627 B2 | 4/2006 | Fowler, Jr. et al. |
| 7,049,603 B2 | 5/2006 | Martoff |
| 6,448,560 B1 | 9/2006 | Tumer |
| 7,151,815 B2 | 12/2006 | Ruddy et al. |
| 7,317,195 B2 | 1/2008 | Eikman |
| 7,366,282 B2 | 4/2008 | Peschmann |
| 7,369,640 B2 | 5/2008 | Seppi et al. |
| 7,521,686 B2 | 4/2009 | Stuenkel et al. |
| 2001/0048730 A1 | 12/2001 | Oshima et al. |
| 2002/0036270 A1 | 3/2002 | Tumer |
| 2002/0067789 A1 | 6/2002 | Wallace et al. |
| 2002/0125429 A1 | 9/2002 | Lebrun et al. |
| 2002/0175288 A1 | 11/2002 | Taleyarkhan |
| 2003/0006376 A1 | 1/2003 | Tumer |
| 2003/0015655 A1 | 1/2003 | Ryden |
| 2003/0081724 A1 | 5/2003 | Piestrup |
| 2003/0111611 A1 | 6/2003 | Maublant |
| 2003/0116713 A1 * | 6/2003 | Cooke et al. ................. 250/369 |

| | | |
|---|---|---|
| 2003/0165211 A1 | 9/2003 | Grodzins et al. |
| 2003/0189510 A1 | 10/2003 | Anderton et al. |
| 2003/0197128 A1 | 10/2003 | Tumer |
| 2003/0205677 A1 | 11/2003 | Caldwell et al. |
| 2003/0226971 A1 | 12/2003 | Chandross et al. |
| 2004/0000645 A1 | 1/2004 | Ramsden et al. |
| 2004/0051044 A1 | 3/2004 | Bjurman et al. |
| 2004/0109532 A1 | 6/2004 | Ford et al. |
| 2004/0200966 A1* | 10/2004 | Ramsden ............ 250/367 |
| 2004/0251419 A1 | 12/2004 | Nelson et al. |
| 2005/0006589 A1* | 1/2005 | Joung et al. ........ 250/370.09 |
| 2005/0011849 A1 | 1/2005 | Chattey |
| 2005/0017181 A1 | 1/2005 | Kearfott et al. |
| 2005/0253073 A1* | 11/2005 | Joram et al. ......... 250/363.03 |
| 2005/0263711 A1* | 12/2005 | Gerl et al. .............. 250/393 |
| 2005/0275545 A1 | 12/2005 | Alioto et al. |
| 2006/0011849 A1 | 1/2006 | Tseng et al. |
| 2006/0017000 A1 | 1/2006 | Martoff |
| 2006/0049357 A1* | 3/2006 | Tumer ............... 250/363.03 |
| 2006/0102845 A1* | 5/2006 | Williams et al. ...... 250/363.03 |
| 2006/0219932 A1 | 10/2006 | Fellerman et al. |
| 2006/0284094 A1 | 12/2006 | Inbar et al. |
| 2006/0289775 A1 | 12/2006 | Inbar |
| 2007/0102646 A1 | 5/2007 | Goldberg |
| 2007/0187608 A1 | 8/2007 | Beer et al. |
| 2007/0205373 A1 | 9/2007 | Kornblau et al. |
| 2007/0210255 A1 | 9/2007 | Bjorkholm |
| 2007/0278423 A1 | 12/2007 | Eikman |
| 2008/0023631 A1 | 1/2008 | Majors et al. |
| 2008/0067390 A1* | 3/2008 | Ramsden et al. ........ 250/361 R |
| 2008/0135772 A1 | 6/2008 | Claus et al. |
| 2008/0175351 A1 | 7/2008 | Norman et al. |

FOREIGN PATENT DOCUMENTS

| | | |
|---|---|---|
| DE | 10149888 | 3/2003 |
| EP | 0003811 | 9/1979 |
| EP | 0060574 | 9/1982 |
| EP | 1026522 | 8/2000 |
| JP | 54-082275 | 6/1979 |
| JP | 61-060595 | 3/1986 |
| JP | 61-149884 | 7/1986 |
| RU | 2129289 | 4/1999 |
| RU | 2150127 | 5/2000 |
| RU | 2150693 | 6/2000 |
| RU | 2158938 | 11/2000 |
| RU | 2161299 | 12/2000 |
| RU | 2191408 | 10/2002 |
| RU | 2196980 | 1/2003 |
| WO | WO 99/03155 | 1/1999 |
| WO | WO 99/22251 | 5/1999 |
| WO | WO 03/048815 | 6/2003 |
| WO | WO 2004/051311 | 6/2004 |
| WO | WO 2004/061448 | 7/2004 |
| WO | WO 2004/092719 | 10/2004 |

OTHER PUBLICATIONS

Offical Action Dated Oct. 27, 2009 From the US Patent and Trademark Office Re.: U.S. Appl. No. 11/348,040.
Official Action Dated Jul. 24, 2008 From the US Patent and Trademark Office Re.: U.S. Appl. No. 11/463,112.
Official Action Dated May 1, 2009 From the US Patent and Trademark Office Re.: U.S. Appl. No. 11/463,112.
Official Action Dated Mar. 3, 2009 From the US Patent and Trademark Office Re.: U.S. Appl. No. 11/348,040.
Official Action Dated Nov. 29, 2007 From the US Patent and Trademark Office Re.: U.S. Appl. No. 11/348,040.
Official Action Dated Jun. 30, 2008 From the US Patent and Trademark Office Re.: U.S. Appl. No. 11/348,040.
Prussin et al. "Nuclear Car Wash Status Report, Aug. 2005", Lawrence Livermore National Laboratory, UCRL-TR-214636, p. 1-85, Aug. 16, 2005.
Slaughter et al. "Detection of Special Nuclear Material in Cargo Containers Using Neutron Interrogation", Lawrence Livermore National Laboratory, UCRL-ID-155315, p. 1-63, Aug. 2003.
Slaughter et al. "The 'Nuclear Car Wash': A Scanner to Detect Illicit Special Nuclear Material in Cargo Containers", IEEE Sensors Journal, 5(4): 560-564, 2005.
Response Dated Jan. 26, 2010 to Official Action of Dec. 10, 2009 From the US Patent and Trademark Office Re.: U.S. Appl. No. 11/463,112.
Response Dated Jan. 26, 2010 to Official Action of Oct. 27, 2009 From the US Patent and Trademark Office Re.: U.S. Appl. No. 11/348,040.
Official Action Dated May 25, 2010 From the US Patent and Trademark Office Re.: U.S. Appl. No. 11/348,040.
Official Action Dated May 27, 2010 From the US Patent and Trademark Office Re.: U.S. Appl. No. 11/463,112.

* cited by examiner

METHODS AND APPARATUS FOR IMPROVED GAMMA SPECTRA GENERATION

RELATED APPLICATIONS

The present application is a continuation in part of U.S. patent application Ser. No. 11/463,112 filed Aug. 8, 2006 (published Dec. 28, 2006 as US Patent Publication 2006/0289775) and claims the benefit under 35 U.S.C. §1.19(e) of U.S. Provisional application 60/767,379 filed Mar. 23, 2006, 60/891,551 filed Feb. 26, 2007, 60/891,727 filed Feb. 27, 2007, 60/891,729 filed Feb. 27, 2007, 60/891,738 filed Feb. 27, 2007, 60/891,751 filled Feb. 27, 2007, 60/892,254 filled Mar. 1, 2007 and 60/892,893 filled Mar. 5, 2007. U.S. patent application Ser. No. 11/463,112 is a continuation in part of U.S. patent application Ser. No. 11/348,040 filed Feb. 6, 2006 (published Dec. 28, 2006 as US Patent Publication 2006/0284094), which claims the benefit under 35 U.S.C. §1.19(e) of U.S. Provisional Applications 60/649,541 filed Feb. 4, 2005; 60/651,622 filed Feb. 11, 2005; 60/654,964 filed Feb. 23, 2005. This application also claims the benefit under 35 U.S.C. §1.19(e) of U.S. Provisional Applications 60/706,013 filed Aug. 8, 2005; 60/706,752 filed Aug. 10, 2005; 60/707,154 filed Aug. 11, 2005; 60/709,428 filed Aug. 19, 2005; 60/710,891 filed Aug. 25, 2005; 60/596,769 filed Oct. 20, 2005; 60/596,814 filed Oct. 24, 2005; 60/597,354 filed Nov. 28, 2005; 60/597,434 filed Dec. 1, 2005; 60/597,435 filed Dec. 1, 2005, 60/597,569 filed Dec. 10, 2005; 60/597,629 filed Dec. 14, 2005.

All of the above mentioned applications and publications are incorporated herein by reference. Patent publications 2006/0289775 and 2006/0284094 are referred to herein as "the above referenced publications."

FIELD OF THE INVENTION

The present invention is in the field of threat detection.

BACKGROUND OF THE INVENTION

For a number of years governments have been struggling with how to keep terrorists from trafficking in special nuclear materials (SNM) and devices containing such materials and radiological dispersion devices (RDD). Such materials include weapon grade Uranium (WGU) and weapon grade Plutonium (WGP) and radioactive sources used for RDD. Such trafficking can take place by people, car, truck, container, rail, ship or other supply chain means. There is a long perceived need for a cost/effective system to screen, detect, locate and identify SNM or RDD materials or devices that are being transported. Furthermore there is a long felt need for an effective means to scan, locate and identify suspected areas in which those threats may be present.

Such screening is difficult in practice due, at least in part, to the environment in which it is done. Firstly, environmental radiation (including terrestrial and atmospheric radiation) of gamma rays and neutrons is substantial. Secondly, benign Normally Occurring Radiological Materials [NORM] like K-40 occur in nature and are present in many benign cargos. For example, kitty litter, plywood, concrete and bananas, emit substantial amounts of benign radiation. Additionally, humans undergoing nuclear medicine imaging or radiation treatment using implanted radioactive seeds can emit sizeable amounts of radiation. These and other "natural" or "benign" sources of radiation coupled with the ability to shield (using high Z materials like lead to shield gammas and some low Z materials to shield neutrons) the SNM and RDD, make simple detection schemes either ineffective in finding nuclear radiological threats or prone to a poor receiver operating characteristic (ROC), for example by having a large percentage of false positives.

Substantial numbers of false positives (also called 'false alarms') produce a large number of screened objects (e.g. vehicles, people, cargo) that have to be searched or otherwise vetted manually, making such simple systems practically useless for screening large numbers of objects. At present the leading means to screen RDD and SNM trafficking vehicles are the so called next generation Advanced Spectroscopic Portals (ASP) developed recently for the U.S. DHS DNDO.

More than 90% of the ASP systems use an array of 8 or 16 relatively small NaI(Tl) scintillators (e.g., 0.1×0.1×0.4 meter), to detect the gamma energy spectroscopic signatures of SNM and RDD, and a small array of He-3 Neutron detectors to detect and count neutron emissions.

ASP systems do not provide nuclear imaging, of either gamma rays or neutrons. ASP systems detection performance is limited primarily due to the high cost of NaI detectors, which limits the system detection area/sensitivity. Because of the high price and practical cost constraints of the NaI(Tl) and He-3 detectors, their number is small [typically the ASP NaI detectors have a sensitive area of 0.64 meter$^2$] relative to the distance from the threat radiation source, resulting in a small solid angle of the detector as viewed by the threat. This limits the detection sensitivity and selectivity.

It is noted that while, for a given stand-off distance, the total detected radiation (benign radiation and the threat radiation) is proportional to the solid angle subtended by the detectors at the emitting radiation sources, the background radiation sigma (statistical standard deviation) is proportional to the square root of the solid angle. Thus, a 100 fold increase in solid angle (≈detector size) results in a 10 fold increase in detection certainty (number of standard deviations above the signal mean) to threats in a given screening condition. For example, if the small area (i.e. small solid angle) could reliably detect a source with 10 micro Curie of activity, the 100 times larger detector will detect 1 micro Curie with the same certainty (same rate of true and false detections, given the same geometry and background radiation).

Furthermore, the ASP detects only one threat signature for WGU and RDD—its gamma spectroscopic signature, since such materials do not emit neutrons in an amount much different from background. For WGP it detects also as a second signature its neutron emission. Having only one or two signature detection capabilities makes the system less reliable.

In addition, ASP systems do not provide several other SNM-RDD signatures such as 1D, 2D and 3D nuclear imaging, temporally based signatures such as cascade isotopes (e.g. Co$^{60}$) doublets detection and gamma/neutron salvo emanating from spontaneous fission of SNM. Having such additional signatures would improve the ROC.

These and other limitations are known in the art and drove the DHS DNDO to publish the BAA-06-01 document. This publication states the need to come up with transformational technologies which will provide a much better than ASP SNM signatures detection performance, such as lower cost detectors, improved energy resolution detectors, the use of other than gamma energy spectroscopy SNM-signatures (e.g. spontaneous fission signature, imaging), detection of incident gamma or neutron directionality and other means that improve the overall system ROC.

The prior art teaches that organic scintillators (OS) provide a highly robust and stable material that is easily formable in many shapes, with the best detection sensitivity when cost per detected Gamma events is considered. On the other hand, there is a common belief in the prior art that organic scintillators, although some non-spectroscopic OS based portals have been used in the past, fail to provide acceptable ROC as they do not provide energy resolution (or at best a very limited one) in the context of nuclear threat detection. This explains why organic scintillators haven't been used for direct gamma spectroscopy isotope identification in nuclear radiological spectroscopic portals (NRSPs) (in the way NaI(Tl) and HPGe detectors are used in ASP) to identify and/or provide reliable energy window of SNM, RDD and NORM selected gamma energies. Furthermore, it is accepted that for all practical purposes screening portals organic scintillators have a poor gamma efficiency or "stopping power" at energies above 300 keV as compared to NaI(Tl). A review of this issue is given in: Stromswold, D.C. et al., "Comparison of plastic and NaI(Tl) scintillators for vehicle portal monitor applications" in: Nuclear Science Symposium Conference Record, 2003 IEEE, Vol (2) pp. 1065-1069. October 2003. The disclosure of this paper is incorporated herein by reference.

In recent studies related to anti-neutrino detection (see http.//arxiv.org/ftp/physics/papers/404/0404071.pdf) and in other publication of the same group (see F. Suekane et al., "An overview of the KamLAND 1; K-RCNP International School and mini-Workshop for Scintillating Crystals and their Applications in Particle and Nuclear Physics Nov., 17-18, 2003, KEK, Japan, it has been shown that extremely large (8 meter diameter) expensive (>$100 million, due mainly to the very large detector size and large number of large [18"] photomultiplier tubes (PMTs) used) liquid scintillator detectors can provide gamma energy resolution which is close to that of NaI(Tl). Such devices are not practical for large scale (or even small scale) deployment for threat detection due to their geometry and astronomical cost. The disclosure of this paper is incorporated herein by reference.

R. C. Byrd et al., in "Nuclear Detection to Prevent or Defeat Clandestine Nuclear Attack", IEEE Sensors Journal, Vol. 5 No. 4, pp. 593-609, 2005, present a review of prior art of SNMRDD screening, detection and identification techniques. The disclosure of these papers is incorporated herein by reference.

In a PNNL report by Reeder, Paul L. et al., "Progress Report for the Advanced Large-Area Plastic Scintillator (ALPS) Project: FY 2003 Final" PNNL-14490, 2003, a PVT light collection efficiency of 40% for a 127 cm long detector is described. It should be noted that a straight forward extension to 4 meters length of the PNNL OS approach would have resulted in less than 25% light collection and less than 15% light collection for a 6 m long detector. The disclosure of the PNNL report is incorporated herein by reference.

The above referenced patent publications describe a number of embodiments that ameliorate some or all of these problems. For example, these publications describe a number of structures to detect radiation particles, such as those emitted by nuclear threats with increased efficiency and spectral purity. Some embodiments utilize thick plastic or liquid scintillator materials to increase the capture efficiency and allow for more accurate determination of the captured radiation particles. In general the energy in the particles is captured in a number of interactions, in which the radiation gives up energy converted into light scintillations. As mentioned therein, despite the thickness of the detector, for some particles, a portion of the energy is not captured due to what are described as "escape quanta", namely uncaptured secondary radiation which escapes from the detector. U.S. 2006/0289775 mentions in paragraph [214] that it is possible to discriminate particles that do not give up all their energy based on the number of interactions that take place and result in scintillations.

Further information on the state of the art can be found in the Background section of and referenced prior art listed and included by reference in the above referenced U.S. patent application and provisional patent applications.

SUMMARY OF THE INVENTION

As indicated US Patent publications 2006/0289775 and 2006/0284094 "the above referenced publications" are incorporated herein by reference and the present application is a continuation in part thereof. Thus the inclusion of them in the background section should not be considered to be an admission that the claims hereof are anticipated by 35 U.S.C. §102. It is noted that the invention claimed herein was not claimed in the earlier applications and that this invention is a joint invention of the inventors of the present application.

The above referenced publications are very long and describe detectors for nuclear radiation and systems and methods which utilize these detectors. Since the present invention is mainly concerned with methods of improving them, the description of systems that utilize the detectors is not described herein in detail. Rather, applicants rely on the incorporation by reference of the above referenced application for support of any claims utilizing the improvements described herein.

An aspect of some embodiments of the invention is concerned with methods for the improvement in the spectral sensitivity of detectors in which "escape quanta" cause a reduction in the spectral sensitivity. It is especially useful in conjunction with detectors of a type described in the above referenced publications.

In some embodiments of the invention, incoming radiation particles/photons for which some of the energy escapes without causing scintillations in the detector are identified based on the number of scintillations that the particle creates as it interacts with the detector material and loses its energy. In some embodiments of the invention, the incident energy identification is based on one or more metrics or scores, such as the time between the start of the first and last recorded scintillations, the distance from a surface of the detector of the last detected scintillation, the number of separate scintillator elements in the detector that produce scintillations from the event and/or the number of scintillation events, as well as the overall volume or size of the 'scintillation envelope'.

In an exemplary embodiment of the invention, the detector is segmented such that gamma rays can be transmitted substantially without impediment between segments while light generated by scintillations within a segment stays substantially within that segment and is individually measured.

Optionally, the detector is a planar detector formed as a series of elongate detector segments placed side by side. Preferably, the detector is also segmented in a direction normal to the plane of the detector, by light reflecting, low radiation attenuating barriers, such that light from scintillations that occur at different depths in the detector are confined to the detector segments in which they occur. Since the barriers are substantially transparent to gamma and neutron radiation, gamma and neutron radiation that contains residual energy after a given scintillation can pass substantially unimpeded to a different segment. For nuclear threat detection in objects, such as trucks and maritime containers a 4 m×4 m×0.5 m detector assembly is typically segmented into 200 elongated segments, each measuring 0.1 m×0.1 m×4 m. However, the cross-section of the elongate segments can have various other forms in addition to the rectangular form indicated above.

In an exemplary embodiment of the invention, at least two photo-sensors, such as a photomultiplier tube (PMT), are optically coupled to the ends of each segment. The coupled photo-sensors collect light from the ends of the scintillator segments.

By comparing the time and/or intensity of the scintillation light detected at the two photo-sensors (or signals generated by the photo-sensors in response to the light), the position of the initial scintillation within of the segment can be estimated using one or both of time of flight (TOF) techniques and the ratio of the PMT signals. As the total charge emanating from the two PMTs is integrated, it represents the total collected light, which can be used to determine the deposited energy of the scintillation, especially after the segment is calibrated as described herein.

Thus, a two dimensional array of such elongate segment can be used to localize the position of the incident particle scintillation within the detector assembly in three dimensions. By summing the signals produced by the individual PMTs in response to the scintillations, determine the incident particle energy, assuming full energy deposition within the detector volume.

It should be understood that such scintillators can be made of any scintillating material. However, the present inventor has found that organic scintillators and especially liquid organic scintillators (LS) have the requisite requirements for detection of nuclear threats. Typical LS for use in the invention comprises a cocktail of (for a 4 m×4 m×0.5 m volume detector) 12 kg PPO, 6.3 $m^3$ normal-dodecane and 1.6 $m^3$ pseudo cumene. The barriers can be of many materials. Some useful materials are thin nylon sheets, coated with a thin layer of reflecting paint, or sheets of naturally reflective Teflon. In some embodiments of the invention, the segments are formed by creating such partitions in a vessel filled with LS material.

In an embodiment of the invention, the detector is a 2D imaging detector. It is capable of imaging suspected one or both of gamma rays and neutrons. In one embodiment, the detector is fitted with high Z (e.g. lead) collimators for gamma collimation. Alternatively or additionally, the detector is formed of segments, some of which act as collimators for other segments, since they absorb both gammas and neutrons. This second option is also useful for imaging neutrons.

Alternatively or additionally, gross direction capability for both incident gammas and neutrons is achieved even without collimators. As to gamma rays, the incident gamma rays produce a number of scintillations as they travel through the detector segments. The side of the detector, the 2D positions facing the screened item, sub-nanosecond event times, and deposited energy of these scintillations are determined, and a gross direction of incidence of the gamma ray is estimated from analysis of positions of the first and second scintillations emanating from the incident particle interaction with individual segments. This methodology is especially useful in reducing terrestrial and atmospheric radiation by a veto on particles that most probably come from a direction other than the direction of the screened object. As to neutrons, it is possible to determine if the neutrons entered the detector from the top, sides, front side facing the screened object or rear side facing to screened object, since neutrons of typical WGP spontaneous fission energies are captured within the first 5-10 cm of OS detector material. This enables the rejection of more than a half the environmental neutron radiation and an increase in selectivity (e.g., improved ROC) of the system.

Optionally, since a number of images are obtainable as the vehicle passes the large detector, linear (partial views) tomography using one or two slanted collimation means or transaxial tomography can be performed by using more than two detectors. There is also a possibility to provide concurrently linear and transaxial tomography. Techniques for performing such tomography in the field of X-ray and nuclear tomography are well known, but have not been applied to nuclear threat detection.

An aspect of some embodiments of the invention is concerned with large area detectors (optionally imaging detectors) preferably having >75% stopping power at 0.1-3 MeV gamma energy range suitable for screening a threat vehicle or object, such as a person, car, truck, container, package, train, aircraft or boat. Generally speaking, such detectors are very expensive due to the cost of the detector assembly, the costs of scintillators and/or the costs of the relatively large numbers of photo-sensors or direct nuclear detectors like high purity germanium HPGe detectors that are required. A segmented OS (e.g. LS or Plastic Scintillator) detector according to some embodiments of the invention allows for the construction of a large detectors having extremely high sensitivity for both neutrons and gammas, NaI(Tl) like gamma energy resolution, temporal resolution and intrinsic gamma and neutron spatial resolution that are suitable for reliable nuclear/radiological threat detection for the cost of the most advanced prior art methods.

In some embodiments of the invention a loci dependent light collection efficiency correction is applied to the detector segments energy signals. This correction mitigates a significant variable of loci dependent scintillation light collection efficiency, resulting in a better energy resolution.

In a preferred embodiment of the invention, a segmented LS detector having high light reflecting partitions, coupled to PMTs photocathodes which cover more than 73% of the segments cross section is used. In some embodiments, LS filled optical couplers are used to match the sizes of the PMT and the segments. Such segments use OS such as the PPO based LS described above which have a "mean attenuation length" larger than 15 meters, an index of refraction of approximately 1.5 to match the PMT glass index of refraction, while the PPO emission spectrum matches the sensitivity spectrum of Bi-alkali PMTs. The PMT face is preferably in contact with the LS.

This ensemble may, under some circumstances, provide near 50% light collection efficiency, even for long 3-6 meter detector segments. This increases the number of photoelectrons per MeV at the PMTs, resulting in better energy resolution timestamp and neutron/gamma ID precision. It should be noted that one of the reasons that caused the prior art to believe that OS detectors had poor gamma spectroscopic ability was the low light collection efficiency of elongated scintillators that might be useful for threat detection.

In some embodiments of the invention an OS scintillator assembly larger than 1×1×0.4 meter is used to allow most of the incident gammas having energies of 2.6 MeV or more to substantially deposit their full energy in the scintillator assembly, thus eliminating much of the gamma energy resolution loss due to escape quanta associated with smaller detectors.

In a typical embodiment, a scintillation detector approximately 50 cm deep can have a 4×4 or 6×4 (length×height) meter front face. Larger devices can be constructed, and smaller sizes, such as 2×2 m can be useful for "car size only" or pallets lanes. Such large detectors have a number of potential advantages. One advantage is that the efficiency of capture of both gammas and neutrons emanating from the screened field of view is greatly improved, due to the large subtended angle that they present to the radiation sources. If radionuclide imaging using high Z collimators is implemented this high gamma sensitivity hike is reduced. A second advantage is that the efficiency of detecting temporally coincident SNM RDD signatures like cascaded isotopes and spontaneous fission gamma/neutron salvos is increased. For example, doublet capture is greatly improved, since the probability of doublet capture is roughly the square of the probability of singlet capture. A substantial percentage of doublet capture results in improved discrimination between some doublet emitting threats like $Co^{-60}$ (used in some RDD designs) and benign radiation and improved sensitivity to threatening radiation. It should be noted that the probability of random chance detectability of doublets is extremely low as the background radiation rate is low approximately 1-3 kcounts per second per square meter, while the doublets detection temporal coincidence window is short (about 20 nanosec).

Another advantage of large detectors, especially imaging detectors, is the amount of time each portion of a moving vehicle is screened. Taking into account the movement of the vehicle, every portion of the moving vehicle stays within range longer and provides a better detected signal.

Some embodiments of the detectors can identify the general or gross direction of an incident gamma and/or neutron particle independent of the use of a collimator and/or shielding. In an embodiment of the invention, at least some events that are incident from a direction other than a direction from which they are expected when screening an object, can be rejected. This allows for a decrease in background radiation both from environmental radiation and from radiation emanating from other objects (e.g. nuclear medicine patients outside the field of screening). In addition, it enables the rejection of events that enter from the back, sides, top and bottom of the detector. Rejecting events that do not come from the expected direction can increase the reliable threat detectability of the system many fold.

Some systems utilizing the detectors provide one or a plurality of energy windowed images on an isotope-by-isotope basis. This technique is used in nuclear medicine imaging applications to provide maps of individual isotopes. Providing maps for different isotopes in threat detectors improves the image and its point source contrast over the background radiation. The efficacy of such windowing is improved by the methods of the present invention.

Organic scintillator with which the present invention may be used may have both intrinsic spatial and temporal resolution and spectrographic properties to discriminate between isotopes. In an embodiment of the invention, the presence of escape quanta can be detected for a given incident particle, and the event vetoed. This can provide a significant improvement in spectroscopic isotope identification.

The combination of high light detection efficiency and high and uniform collection efficiency associated with loci dependent light collection variation correction and the small rate of escape quanta (due to the large detector) allows for gamma spectroscopic isotope I.D. that is similar to that of detectors with NaI(Tl) scintillators. It should be noted that the exact design of the detector is dependent on a tradeoff between gamma spectroscopic identification and imaging capability. If imaging capability is desired, then some kind of collimation may be required. This reduces the capture efficiency based threat signatures performance. On the other hand, if high particle collection efficiency is desired, for spectroscopy, and temporal coincidence signatures (e.g. cascading isotopes I.D. spontaneous fission gamma/neutron I.D.) detection (discussed below) having no collimators may be preferable, to maximize overall sensitivity. In some embodiments, a combination of areas that have collimation and areas that do not have collimation provide a compromise design. Such embodiments are discussed herein.

It is noted that gamma rays give up their energy inside an organic scintillator material in a series of time and geometrically spaced events (e.g. Compton interactions), each of which produces a separate scintillation. In general, it is preferred to have the size of the segments matched to a mean length between scintillations (this indicates a compromise between low [100 keV gammas having a short distance] and high energy gammas [2.6 MeV having a long distance]), such that the position of each event in the detector is, with high probability, in a different segment. The time constant of a single scintillation is the same order of magnitude (a few nanosec) as the time between scintillations of the same event, hence they can not easily be discriminated from each other by time if they occur inside one measurement channel. If, however, they occur in different segments, their leading edge timestamp, deposited energy and 2D location are separately detected and measured. This allows the use of algorithms used in Compton imaging techniques to detect the gross directionality of the incident gamma, and also allows rejection of gammas that are incident from the back face and to a great extent terrestrial and atmospheric gammas and neutrons.

There is thus provided, in accordance with an embodiment of the invention, a method of improving energy determination of a Gamma event which interacts with a segmented scintillation detector, the method comprising:

identifying radiation events detected by a detector that are likely not to have deposited their full energy in the detector, based only on characteristics of said detected events; and treating the identified radiation events differently from other radiation events that are likely to have deposited their full energy in the detector.

In an embodiment of the invention, identifying comprises determining the number of scintillations caused by a radiation event. Optionally, treating the identified events differently comprises rejecting radiation events causing a number of scintillations below a threshold number.

In an embodiment of the invention, treating the identified events differently comprises rejecting radiation events causing a number of scintillations below a threshold number.

In an embodiment of the invention, identifying events comprises estimating a position and time of scintillations caused by said interactions.

In an embodiment of the invention, identifying is responsive to one or more characteristics chosen from the group consisting of (a) the number of scintillations associated with a given radiation event; (b) the distance of a final scintillation associated with a given radiation event from a boundary of the detector; (c) the time duration of a series of scintillations resulting from a radiation event; or (d) the number of scintillations resulting from a given radiation event. Optionally, the event is rejected is the number of scintillations is below a given number. Optionally, identifying is responsive to at least one, two or to all of (a) (b) or (c).

Optionally, identifying is responsive to at least two three, or all of (a) (b), (c) or (d).

In an embodiment of the invention identifying comprises weighting a probability factor associated with each of said characteristics to provide a score. Optionally, treating differently comprises rejecting events having a weighted score below a given threshold. Optionally, treating differently comprising estimating the energy of said events and utilizing said events with the estimated energy to form an energy spectrum.

In an embodiment of the invention, the scintillator is an organic scintillator.

BRIEF DESCRIPTION OF THE DRAWINGS

Exemplary, non-limiting, embodiments of the invention are described below in conjunction with the following drawings, in which like numbers are used in different drawings to indicate the same or similar elements.

DETAILED DESCRIPTION OF EXEMPLARY EMBODIMENTS

Figure 1:
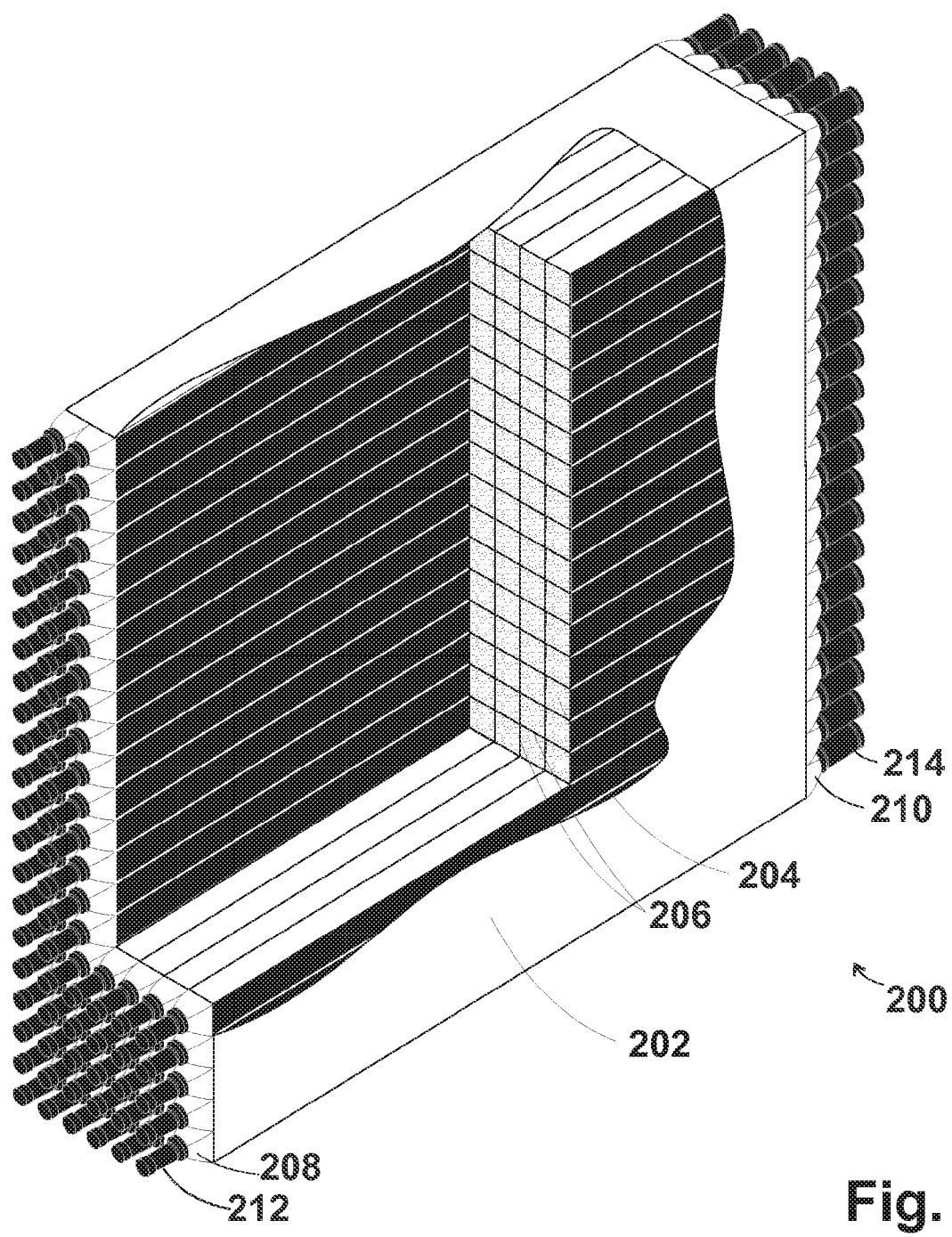
FIG. 1 is a partial cut-away drawing of a detector assembly in accordance with an embodiment of the invention.
Figure 3:
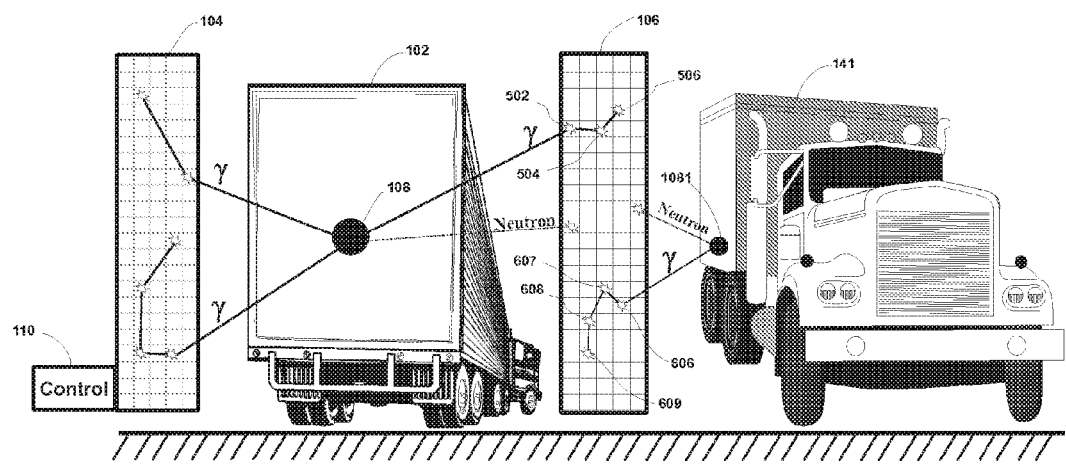
FIG. 3 is a schematic drawing, which illustrates the incident gamma and neutron interactions which take place in detectors of the type described with respect to FIGS. 1, 2A and 2B.

FIG. 1, corresponding to FIG. 3 of US Publication 2006/0289775, shows a partial cut-away view of a segmented detector 200 (corresponding to detectors 104 and 106 of FIG. 1 of US Publication 2006/0289775, in an embodiment of the invention). In the following discussion, the visible face of the detector is referred to as a front face 202 and the other face, as the rear face.

Figure 2A:
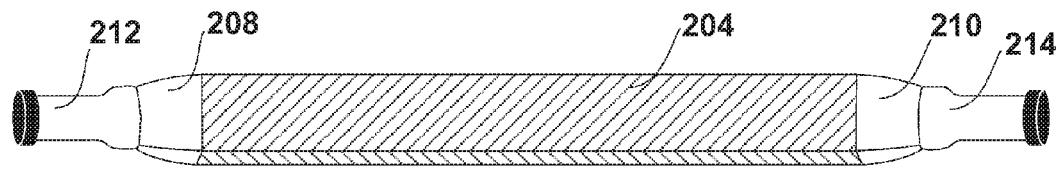
FIGS. 2A and 2B are plane views of two types of elongated detector segments, in accordance with an embodiment of the invention.

As shown in the exemplary embodiment of FIG. 1 and referring also to FIG. 2A, corresponding to FIG. 4A of US Publication 2006/0289775, detector 200 is segmented into elongate segments of scintillation material (one of which is referenced with reference numeral 204) by reflective partitions 206. Thus, light from a scintillation which occurs in a particular segment is reflected from the partitions and remains in the same segment. By the nature of the reflections, the light is reflected toward one or the other end of the elongate segment, where it is optionally concentrated by a light concentrator before being sensed by a light detector such as a photomultiplier tube (PMT). Two light concentrators 208 and 210 and two PMTs 212 and 214 are shown on either end of the elongate scintillation material. Preferably, the scintillation material is an organic scintillator and more preferably a liquid organic scintillator (LS) material. Typical LS for use in the invention comprises (for a 4 m×4 m×0.5 m volume detector) a cocktail of 12 kg PPO, 6.3 m$^3$ normal-dodecane and 1.6 m$^3$ pseudo cumene. The barriers can be made of low Z materials. One useful material is thin nylon sheets, coated with a thin layer of reflective paint; another is a reflective Teflon sheet. It should be noted that the PPO Based LS cocktail mentioned above provides extremely good transparency (20 m light loss distance) and an ideal index of refraction (1.5) and a scintillation light spectrum which matches the sensitivity spectrum of Bi-Alkali photocathodes. It should be also noted that the light concentrators are preferably filled with the LS.

Organic scintillators have various advantages over other scintillators, including robustness, stability and low cost, ease of manufacturing and forming, etc. Its two major deficiencies relative to the commonly used NaI(Tl) scintillator are lower stopping power and lower scintillation efficiency of about 10,000 Photons/MeV. Both of these deficiencies are compensated for in some embodiments of the invention.

Organic scintillator materials are well known and have been used for simple detectors which are not used for gamma spectroscopic applications nor for imaging applications.

Figure 2B:

FIG. 2B, corresponding to FIG. 4B of US Publication 2006/0289775, is similar to FIG. 2A except that the segment cross section is round. It should be noted that while there are spaces between the segments when they are arranged as in FIG. 1, this does not effect operation substantially, since these spaces do not interact significantly with the gamma rays. In an embodiment of invention the individual detector segments have a cylindrical form to improve the scintillation light collection efficiency.

While the rectangular segments can be either self supported or partitions within a liquid vessel, it is believed that cylindrical segments have to be self supported.

Alternatively or additionally, the rectangular segments are spaced from each other.

If solid OS segments are used, then the construction is simpler and all that is needed is to form the segments and paint them with light reflecting paint, or otherwise provide for good reflectivity.

When a scintillation takes place, the light generated is emitted in all directions. Thus, some of the light travels toward one end and is detected by one of the PMTs and some travels in the other direction and is detected up by the other PMT. Any light photons that are not directly aimed along the elongated segment, will reflect off the reflective walls, possibly multiple times and arrive at the end with a slight delay compared to the directly aimed photons. Since the velocity of light in the scintillation medium is known, the time difference between the 'leading edge' of the light signal by the two PMTs is indicative of the position of the interaction along the length of the segment. This method is known in the art as Time of Flight (TOF) localization. In addition since there is some path length dependent attenuation of the light as it travels through the scintillator material, the amplitude of the light is different at the two ends if the scintillation does not occur at the exact midpoint. In an embodiment of the invention one or both of the TOF and amplitude ratio are used to determine the position of the scintillation along elongate segment 204.

Since both time differences and amplitude ratio are affected by other factors, the segments are preferably calibrated using a procedure described below.

As was shown in the incorporated US Patent publication 2006/0284094, with respect to FIGS. 27-29, elongate detectors can be used as threat detectors with one dimensional position discrimination. As can be seen from FIG. 1 of the present application, segments 204 are stacked vertically. Thus, each such stack will provide information as to position of a scintillation occurring at its depth in both the vertical and horizontal directions, i.e., two dimensional position detection. It is noted that the 3D position determination within the detector volume does not by itself provide a 3D image of the detected object.

Scintillation materials of the preferred type detect both neutrons and gamma rays. However, the footprints of scintillations that are produced are different. In both cases, the energy of the incoming radiation is given up via a series of interactions, which result in scintillations. However, the distance between such events is different, being substantially longer for the gamma rays than for neutrons of typical threat detection energies. In an embodiment of the invention, the depth and height of the segments is such that, in many cases, a single scintillation takes place in a particular segment for gamma rays, while multiple interactions, possibly most of the elastic collision interactions, may take place in one or two detector segments for neutrons of energies that are expected from fissile materials.

Another difference is the scintillation rate of decay for the two types of interactions, especially when all the scintillations caused by an incoming event are considered. This phenomenon is well known and has been used to discriminate between gamma rays and neutrons in non-imaging detectors using PSD methods.

In threat detectors the rate of incoming events is generally low at rates of a few thousand counts per second per meter$^2$. At such low rates, the probability that two scintillations from different incident gamma events will take place in a nearby location at the same time window is low; hence each incident particle and its associated scintillations can be analyzed individually. If the signals produced by the PMTs are time stamped and digitized, then scintillations in different segments can be correlated and scintillations caused by a single incident particle can be grouped and analyzed collectively. The utility of this information will be described below.

In the preferred embodiment of the invention, the partitions are substantially transparent to gamma rays and other quanta such as higher energy electrons, neutrons and protons. Thus, while light is trapped within a particular segment, residual energy, in the form of a gamma ray, or other quanta, not converted to light (or heat) in a particular interaction can pass through the partition into a neighboring (or farther) segment.

In an exemplary embodiment detector 200 comprises a plurality of layers of segments, arranged in the direction perpendicular to front face 202, as shown in FIG. 1. Thus, an incoming incident gamma event will cause a series of scintillations as it interacts with the detector. Often, depending on the incident gamma energy, each scintillation takes place in a different segment.

Figure 5:
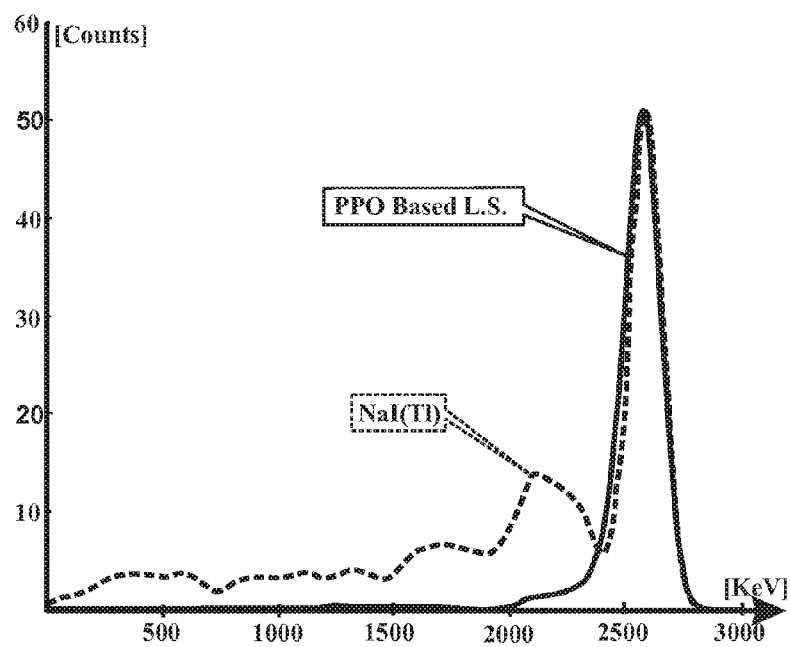
FIG. 5 shows U-232 (daughter) 2.6 MeV energy spectrum comparisons between a NaI(Tl) based detector and a PPO based LS detector according to an embodiment of the invention.

FIG. 3, corresponding to FIG. 5 of US Publication 2006/0289775 is similar to FIG. 1 thereof except that gamma and neutron events and the train of scintillations they cause are shown.

As shown in FIG. 3, nuclear material 108 emits both gamma and neutrons particles. The neutrons cause a series of scintillations, generally in one segment. These scintillations are treated as a single scintillation. This series of scintillations can be identified as being generated by a fast neutron, from a characteristic pulse shape measured by PMTs 212 and 214 (FIGS. 1 and 2). It is noted that a further large scintillation at 2.2 MeV caused by the thermalized (slowed down) neutron capturing on Hydrogen may optionally be considered as an additional correlation, although the time delay for that secondary event is longer and randomly variable. Incoming gamma rays generate a more complex pattern of scintillations. As indicated above, the mean distance between scintillations could be large as compared with the cross-sectional dimensions of segments 204. Thus, one gamma event causes a series of distinct scintillations as it moves through the detector and gives up energy. One such series is indicated by reference numerals 502, 504 and 506.

A statistical most probable incoming direction of the event can be calculated. This direction is only a gross direction and is generally not sufficiently good for imaging. However, it does enable substantial rejection of background radiation such as terrestrial and atmospheric radiation. This is based on the fact that the direction of the gamma particle having the residual energy after Compton an interaction is related to the incoming direction. Generally, the most probably incoming direction is a straight line between the first and second scintillations.

It should be noted that since detector 200 collects light from all of the scintillations caused by the incident gamma rays, the light collected by scintillator 204 can be used for spectroscopic isotope identification. The spectral resolution depends on a number of factors, some of which are correctable. One of these is a systematic variation in light collection efficiency as a function of position or locus of the scintillation within a segment. In general, the main variable in this respect is the distance and average number of reflections that light from a scintillation event has to undergo in order to reach each of the photomultiplier tubes. This is a constant geometric factor which can be calculated (or measured for a typical segment, as described below) and an appropriate correction made to the energy signal (integral of the light received) indicated at the front-end electronics or system software, based on the determined scintillation position along the segment.

Other correctable variations are gain and delay variations among the individual PMTs. These can also be determined as part of an overall calibration for the segment.

In an experimental calibration of loci dependent light collection efficiency variation correction, according to an embodiment of the invention, a point source of mono-energetic gamma rays or high energy mono-energetic betas is placed adjacent to an individual segment and the energy signals provided by the sum of the two PMTs is measured. This is repeated for a number of positions along the length of the segment. Interactions between the OS material in the segment and the ray will cause scintillations. The signals generated by these scintillations in the PMTs at the end of the segments can be used to define a ratio of signals and a time delay between signals as a function of actual position along the segment.

For betas, the entire energy is transferred in a single interaction. However, for gamma, the energy transferred in the interactions (and the energy in the scintillations) is variable. However, the peak energy scintillations can be assumed to be the result of a direct photoelectric effect interaction (or otherwise a full energy deposition within the segment) and thus their energy is known (i.e., it is the energy of the incoming gamma). This known energy and position can be used as a standard for generating a position dependent energy correction table.

This measurement is repeated for all of the segments and used to provide a look-up table of corrections which enable the conversion of pairs of time-stamped light signals into energy signals and position values, which are used in the method described with respect to FIG. 12 of US Publication 2006/0289775.

Alternatively, the energy collection efficiency can be assumed to be the same for all the segments. Similarly, the collection efficiency as a function of position along the segment can also be assumed to be the same for all segments. Thus, measurements of energy signal correction factors can be approximated for all of the segments, by measurements on a single segment. Such approximation can be expected to give poorer spectral results than when energy correction is based on individual measurements of each detector.

Alternatively, the absolute energy sensitivity of the individual segments is measured, and the spatial distribution is assumed to be the same for all segments. In order to do this, an energy measurement, as described above is performed, but only for a single point along the length of the segment. The sum of the values of the signals is compared to a standard and the energy efficiency of collection is determined by the ratio of the signals. Optionally, the standard is based on measurements of a number of segments. It is noted that this alternative also gives a time difference between the detectors on both ends of the segment.

However, neither this nor the other alternative methods of energy signal calibration allow for determination of an absolute time delay, which is used for some embodiments of the invention.

Absolute time delay (and a correction for such delay variations) for each PMT channel can be determined by feeding a light signal that simulates a scintillation into the segment and then measuring the time delays of the signal outputs by each of the two PMTs at the ends of the segment. If the signal is fed into center of the segment for all of the segments, the time delays of all of the PMTs channels for all the segments can be determined so that a comparison of the times of the signals from each PMT can be used to provide a consistent time stamp for each scintillation event.

It is noted that the segments partitions are coated by a light reflecting material, or a reflective Teflon sheet is used. In order to feed light into the segment, a very small portion of the segment is left uncoated or open at the center of the segment. Optionally, an LED is embedded in the segment wall and the delay testing is performed on the segments in the assembled detector. These measurements can be performed periodically to partially compensate for instability or drift of the PMTs.

Optionally, alternatively or additionally, the PMTs and their associated circuitry are calibrated before assembly by feeding a light impulse of a standard intensity and timing into the PMT. The output of the circuitry is then measured and the gain and delay is noted and used to determine a correction factor for both energy measurement and timing. Optionally, the circuitry is adjusted to change the gain and time delay such that the outputs of all the PMTs have the same integrated signal output and timestamps.

Optionally, the PMTs can be removed from the rest of the segments so that they can be replaced, or adjusted when they go out of the calibration range.

If the segments are not separable (e.g., they are in a common liquid vessel) other methods can be used to determine energy and time delay corrections. In this case a collimated beam of high energy gammas (e.g., 1.4 MeV of K-40) is introduced perpendicular to the face of the detector. This beam has a substantial half length in the LS, before the first interaction and some of the interactions will be photoelectric interactions. The energy of these interactions is known and the difference in signals produced in the various segments (also as a function of position along the segments) is used to calibrate for energy. It can also be used to calibrate for position determination using signal strength, using the ratio of signals when the beam is at the center of the section as a standard correction for the ratios produced during detection of threats. This measurement can also define a relative difference in delay between the two end PMTs which can be used to determine the y position correction. As to absolute timing, this can be determined to a reasonable accuracy by the use of LEDs situated near each of the PMTs.

Figure 4:
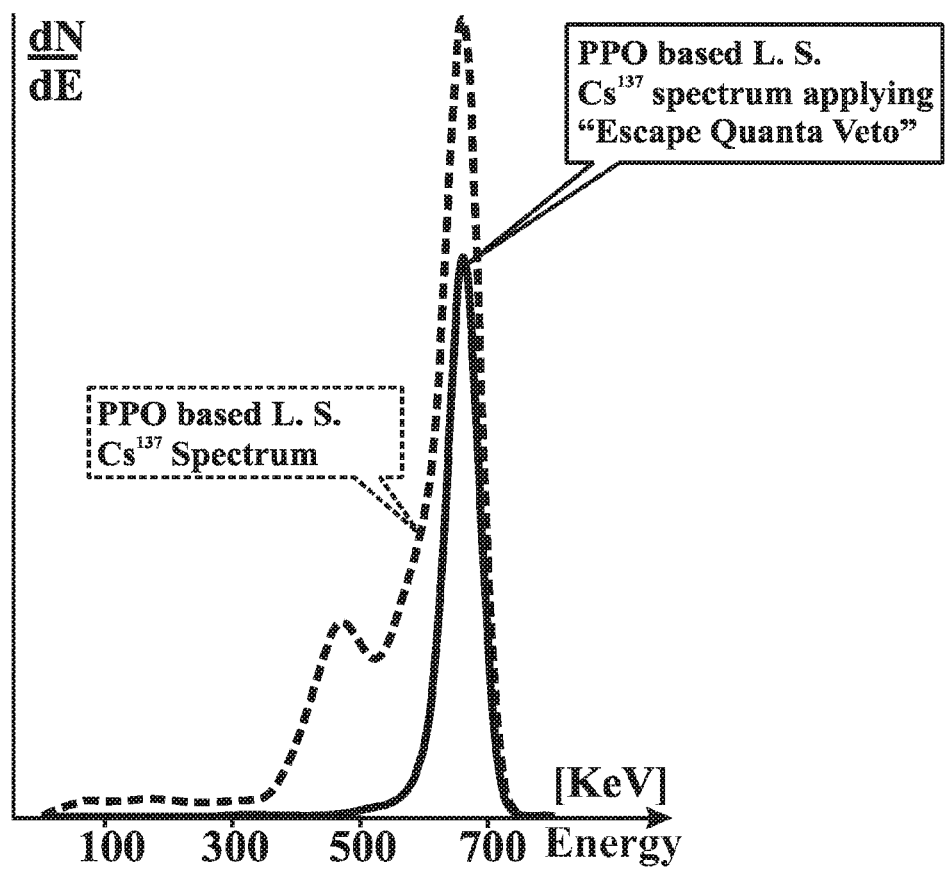
FIG. 4 shows Cs-137 energy spectrum comparisons between a PPO based LS detector without escape quanta veto and with escape quanta veto.
Figure 6:
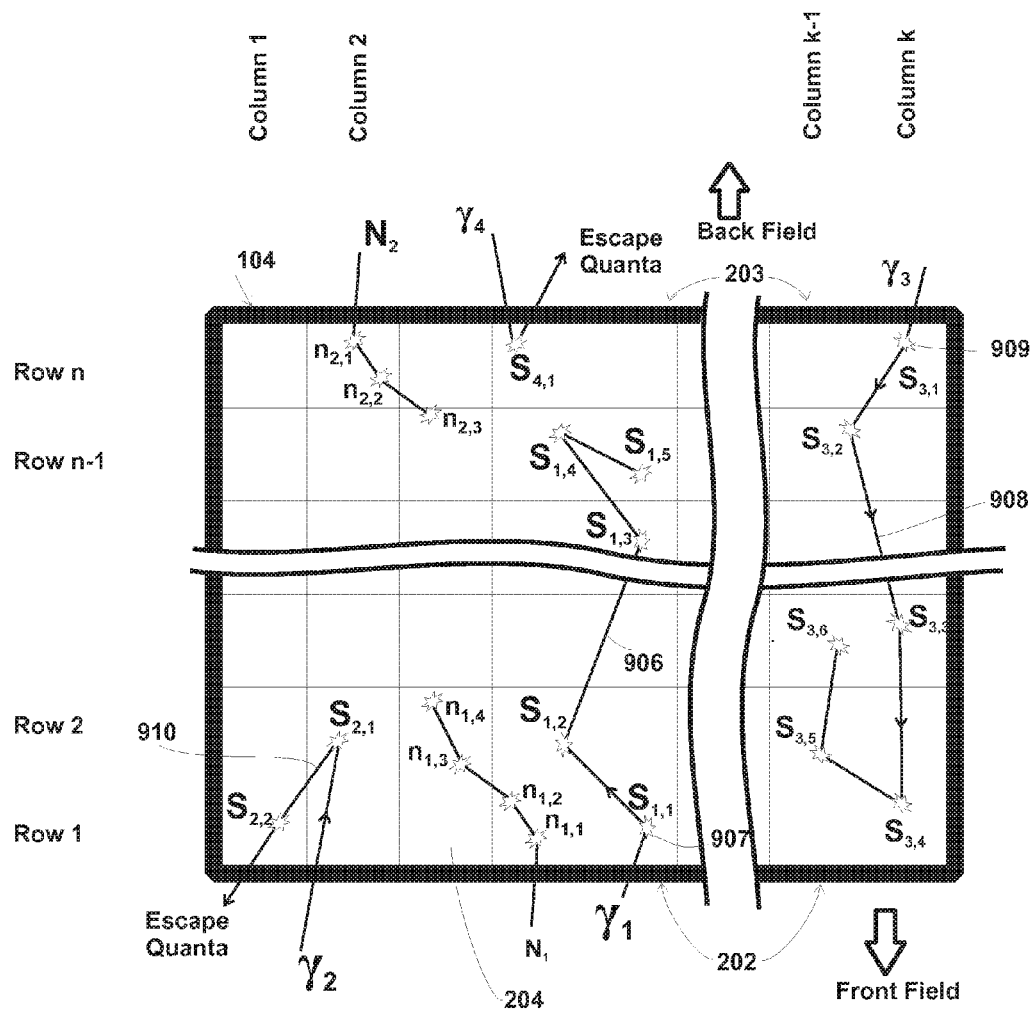
FIG. 6 illustrates various interactions of incident gammas with the segmented detector and a methodology for rejection of events which do not come through the front face.

An additional source of reduction in gamma spectroscopic isotope ID quality is caused by energy that is lost when a residual gamma or electron escapes from the detector. While this phenomenon is well known, correcting for it is difficult, since it can not be determined on an individual basis if such escape occurred and also how much energy escaped. The result will be that the spectrum of a monoenergetic gamma source will have a lower energy pedestal as seen in FIGS. 6 and 7. It has been found that in general most incoming gamma rays of a given energy undergo a typical number of scintillations before they give up all their energy. If events that have less than this number of scintillation are rejected, then the spectrum is substantially improved, at the expense of some loss of events. This phenomenon is shown graphically in FIG. 4, corresponding to FIG. 6 of US Publication 2006/0289775. FIG. 4 shows the results of two Monte Carlo. Simulations, one without and one with escape quanta veto. The first simulation (represented by the upper spectrum) is a straight forward single energy gamma spectrum. Note that the escape quanta result in a lower energy pedestal on the left side of the peak. This phenomenon impairs the detectability of lower energy peaks. The same simulation was repeated, and this time the total number of scintillations was counted for each incident gamma particle. Individual incident gammas which resulted in less than a threshold number of scintillations have been rejected (vetoed). Note the disappearance of a low energy pedestal in the second simulation and the reduction of peak sensitivity. Other features of the space-time distribution of the scintillation events that correlate to the escape quanta were also taken into consideration by the rejection algorithm, as further amplified below.

FIG. 5 corresponding to FIG. 7 of US Publication 2006/0289775, shows normalized 2.6 MeV gamma energy spectrum comparisons between a NaI(Tl) detector and a detector of the type described above.

In an embodiment of this invention the incident Gamma particle signature of the Gamma particle with the segmented (or compartmentalized) detector (see FIGS. 1, 3, 6, and 8) is used to improve on a particle by particle basis the particles energy assessment. More specifically this embodiment incorporates the generation of a probability weighting figure Pfa for each incident Gamma particle which is functionally related to the probability that an incident Gamma did deposit all its energy in the segmented detector bank.

Figure 8:
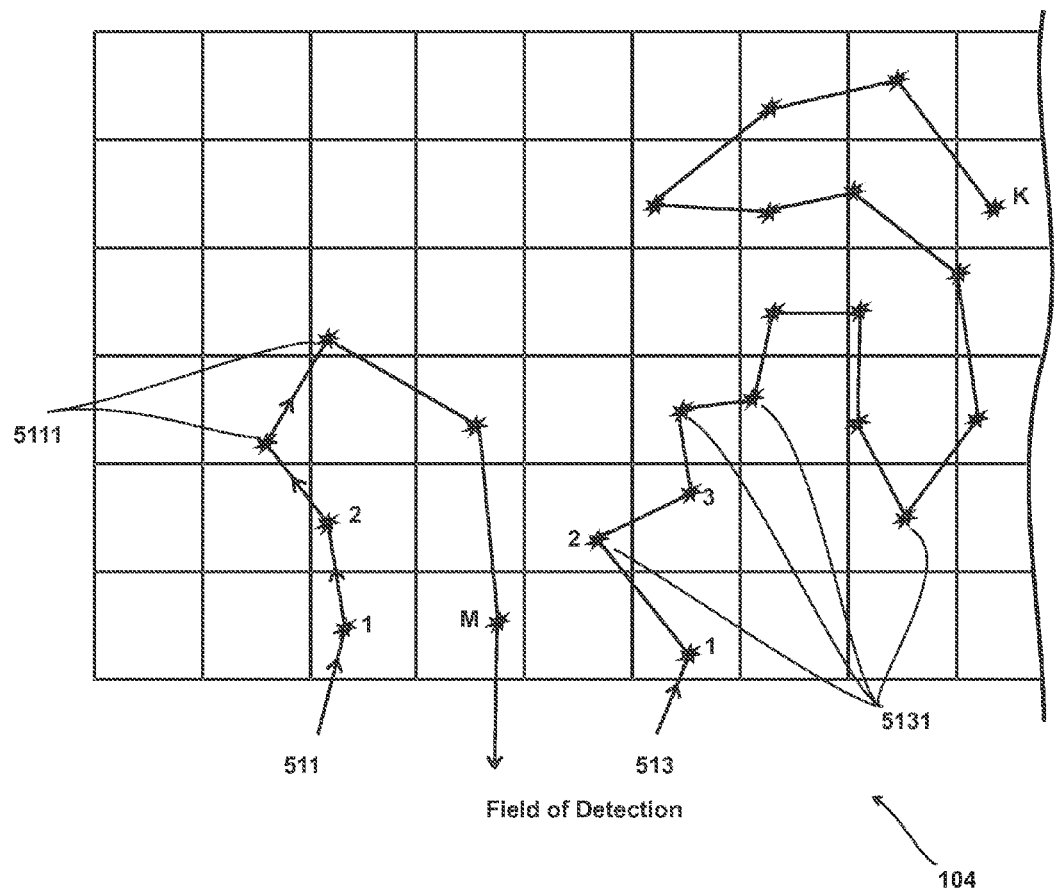
FIG. 8 illustrates various interactions of incident gammas with the segmented detector and a methodology for Amelioration of gamma spectroscopy

A background for this embodiment is given in the discussion of the Escape Quanta phenomenon associated with scintillation detectors (and especially with Organic Scintillators) spectroscopy in a book by G. Knoll "Radiation Detection and Measurement" ($3^{rd}$ edition) (see for example chapter 10 pages 307-322). The effects of "Escape Quanta" on energy determination and spectroscopy is also discussed in other parts of this (and cross referenced) PPA. Knoll shows that Escape Quanta can substantially degrade the determination of the energy of incident Gamma photons, since an unknown fraction of the incident energy is lost to escapes after some initial interactions inside the detector volume. In many applications, where multiple incident energies are present, the partial energy deposition of higher energies will frequently mask the complete energy deposition of lower ones, with no known way to tell those events apart. As shown in FIG. 8, some incident Gamma particles (see for example incident Gamma numeral 513) deposit all of their energy within the scintillation media, while other incident Gammas (see incident Gamma numeral 511) escape via the detector's front surface, thereby mimicking and masking lower energy incident Gammas.

The escaped energy quanta can be anywhere from a very small to a very large portion of the primary photon energy, rendering the energy measurement per event an upper bound at best, well short of useful energy assessment and identification.

It has been observed by the inventors of this PPA using a Monte Carlo simulations (that follow individual events inside the detector) that for the typical (40 KeV to 3 MeV) energy range incident gamma particles interacting with liquid scintillators (required to construct the system described in this application) there are typically about 30 Compton interactions in the detector before a final photoelectric absorption. It was also observed that most escapes, which are the ones that deteriorate gamma energy determination in large organic detectors (e.g. 40×200×200 cm), occur after a few (less than 10) Compton interactions. So if a gamma photon "survives" (or remains inside the detector volume) for the first few (e.g. $\geq 10$) interactions, it is likely to remain inside for the entire interaction set until the final (e.g. photoelectric) interaction, in which case the entire incident energy will be deposited and measured. The Compton collisions (and its energy depositions) in the detector for an incident gamma particle occur at a fairly constant typical rate of several per nanosecond, thus the expected scintillation signals salvo will rise and stay roughly constant for the duration of the collision series, until the final interaction.

Thus, the present inventors have found, as confirmed by the above referenced simulations, that if the final detected scintillation is deep within the detector, the probability is high that all the energy of the incident particle is captured by the scintillator. The closer the final detected scintillation is to an outside surface of the detector, the higher the probability that there was an escape quanta of energy. Furthermore, the present inventors have discovered that if the time difference by the group of scintillations associated with the incoming radiation event is relatively long, then the probability is high that the all of the energy has been captured and that as the time difference decreases, there is a greater probability that there is an escape quanta. The number of scintillation events and the number of segments can also be used to indicate the probability of total energy capture, with the higher numbers representing a higher probability of complete energy capture.

To better understand this embodiment the reader is reminded that each identifiable scintillation generates a precise timestamp, deposited energy and its spatial location.

In one preferred embodiment which utilizes the incident gamma particle interaction with the (partitioned) detector bank to generate a full energy probability score, the following procedure can be used:

Let each sub-detector (cell) be identified by its unique coordinates as cell (I, j, k), and assume at least one of the sub-detectors (see FIG. 4) produces a measurable scintillation signal at a given timestamp.

The scintillation measurements from all sub-detectors signals (which fall within specified spatial and temporal boundaries (e.g. +/−50 cm and +/−20 ns time/space volume) are collected.

This data set is used to determine a probability value Pfa that this event represents a gamma photon that was fully absorbed by the detector.

1. Let dT represent the maximum time difference (in nanosec) from the first to latest timestamp resulting from a single incident particle (i.e. the maximum temporal spread in scintillation start times)
2. Let D represent the geometrical distance (in meters) from the nearest detector surface to the touched cell with the latest timestamp (i.e. the last one to start scintillating within the event time/space volume)
3. Let N represent the total number of activated sub-detectors for the event
4. Assign each of the above parameters a weight and combine them into a single "basket" representing an empirical probability assessment P=f (dT, D, N)
5. Compare P to a selectable threshold value T; if P>T add the event to the Gamma event population (e.g. MCA) for spectral identification applications, otherwise it is rejected for such applications.

The number of scintillation events can be incorporated in the function or alternatively a threshold (for example 10 as indicated above) or can be used to veto events that produce less than the threshold number of scintillations.

It is noted that the population of the rejected particles may be used for applications which do not require accurate energy determination (e.g. spontaneous fission temporal based signature detection, coincidence based radioisotope identification).

The above embodiment with the possible addition of other available parameters that can be correlated to the probability of total absorption (e.g. maximal lateral spatial volume dimension of the group), is then used to weed out incident particles that are not likely to have deposited all its energy within the detector volume. This results in improved energy measurement fidelity of the remaining measurement.

The event temporal/spatial correlated scintillation volume can be selected by a combination of minimum dimension limits as mentioned above with a "quiescence" range—i.e. extend a given time/space dimension beyond the minimum limit if there is any touched cell near the limit.

FIG. 6 corresponding to FIG. 9 of US Publication 2006/0289775 illustrates a methodology for rejection of events which do not come through the front face of the detector, or alternatively for identifying and separating between the events that come through the front or rear faces. As was indicated above, it is possible to determine a statistically probable direction of incidence of a gamma ray. FIG. 6 further illustrates this method. Detector 104, having a front face 202 and a back face 203 is shown with tracks 906, 908, 910 of scintillations caused by three incident gamma rays.

While the probable direction of incidence of gammas associated with tracks 906 and 908 can only be estimated statistically, it is practically certain that the gamma ray that resulted in track 906 is incident from the front of the detector and that associated with track 908 is incident from the back of the detector. This is true for two reasons. First, the initial scintillation 907 of track 906 is nearer the front than the back face and the initial scintillation 909 of track 908 is nearer the back face. This provides a certain probability (depending on the mean free path of the gamma ray and the thickness of the detector) that the track resulting in 906 is caused by an incident ray passing through the front and the track resulting in 908 is caused by a ray passing through the back face. Thus, the sequence of scintillations or each track provides an indication of rear or front entry of the event.

In addition, the direction determined from the initial path of the track shows a high probability of incidence from the front for track 906 and from the back for 908.

In an embodiment of the invention, one or both of these factors (nearness and probable direction) are utilized to separate between gamma rays that enter from the front and those that enter from the back.

Track 910 corresponds to a gamma ray that has a much lower number of scintillations than normal. This is preferably classified as an event that for which not all the energy is captured. Such scintillations are preferably ignored.

FIGS. 7A-7E, corresponding to FIGS. 12A-12E of US Publication 2006/0289775, are simplified flow charts illustrating the methodology used to determine threats and their type, in accordance with an embodiment of the invention.

Figure 7A:
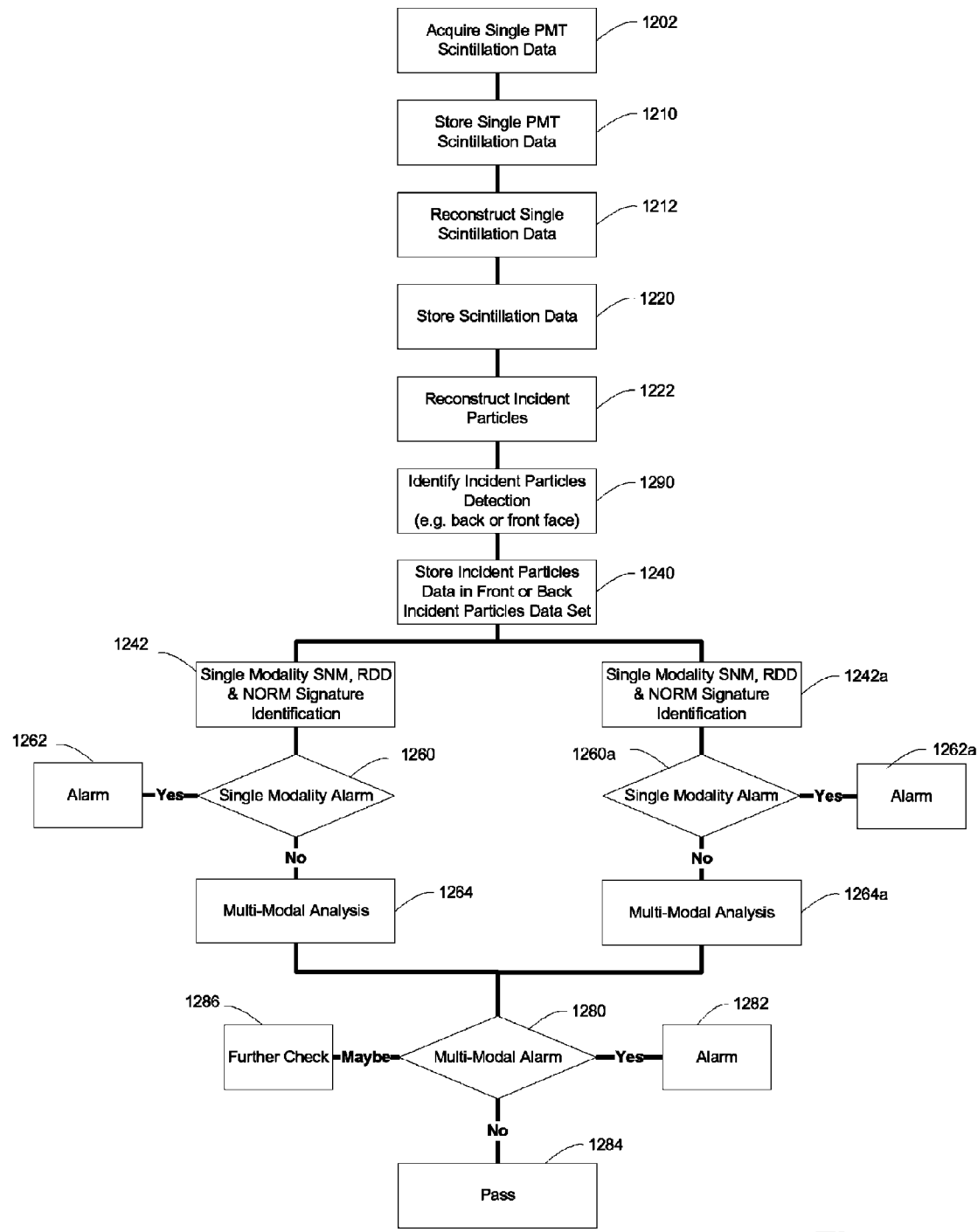
FIGS. 7A-7E are simplified flow charts illustrating the methodology used to determine threats and their type, in accordance with an embodiment of the invention.
Figure 7B:
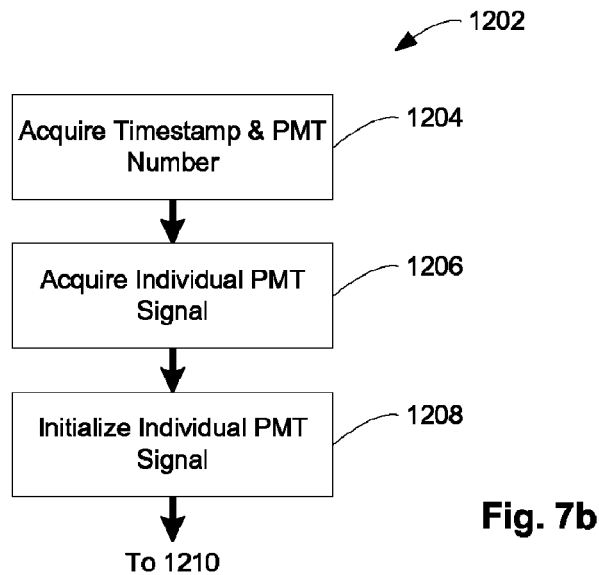
Figure 7C:
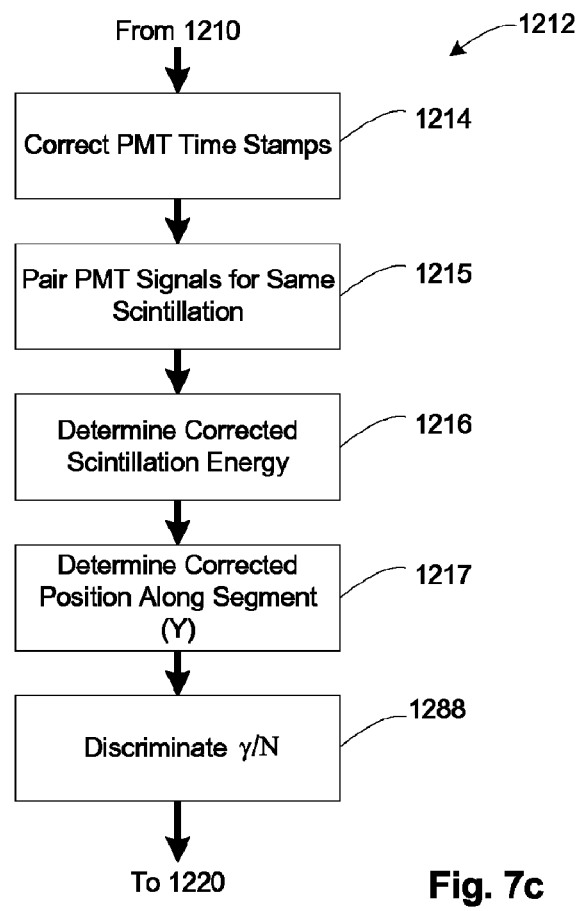
Figure 7D:
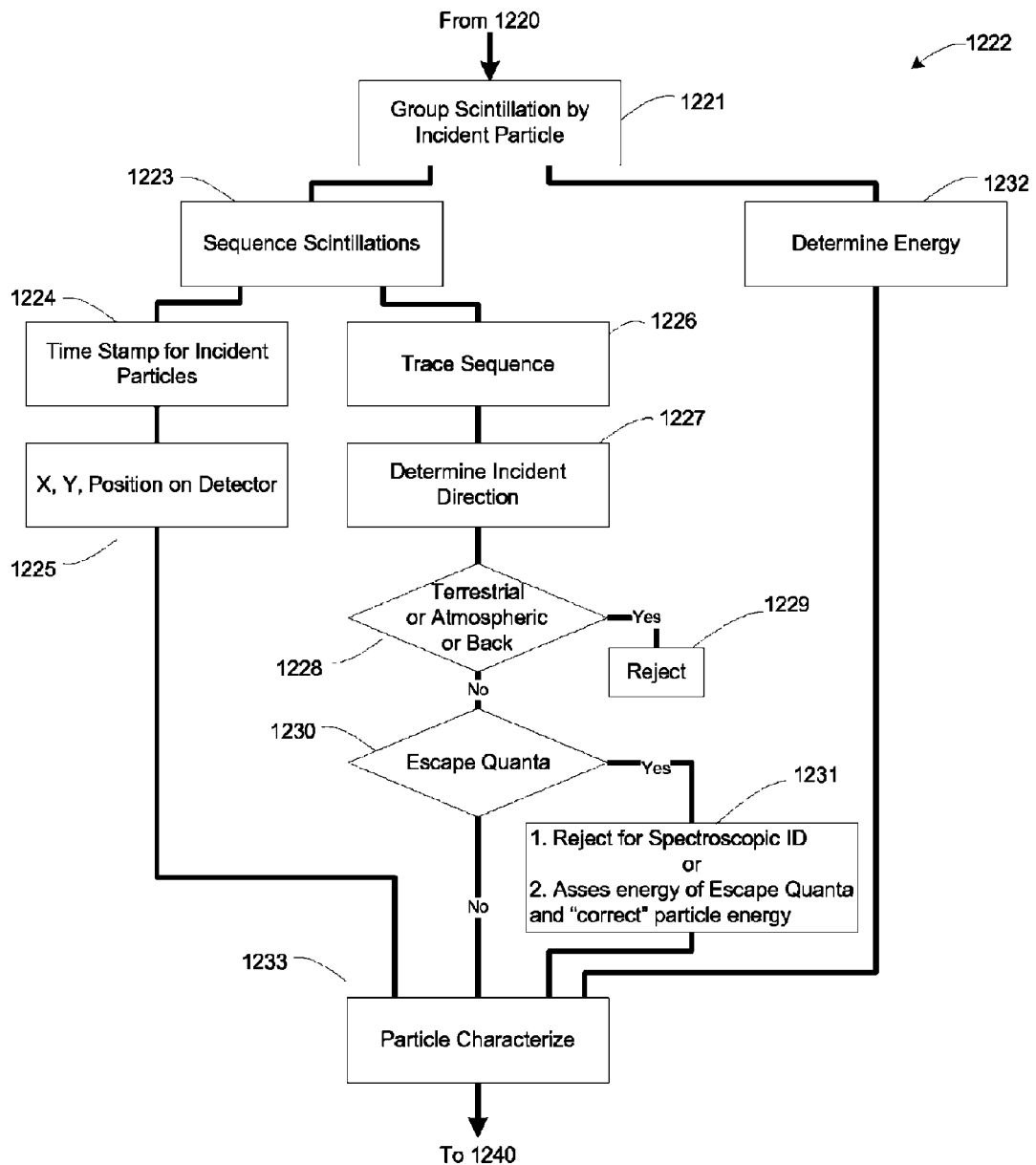
Figure 7E:
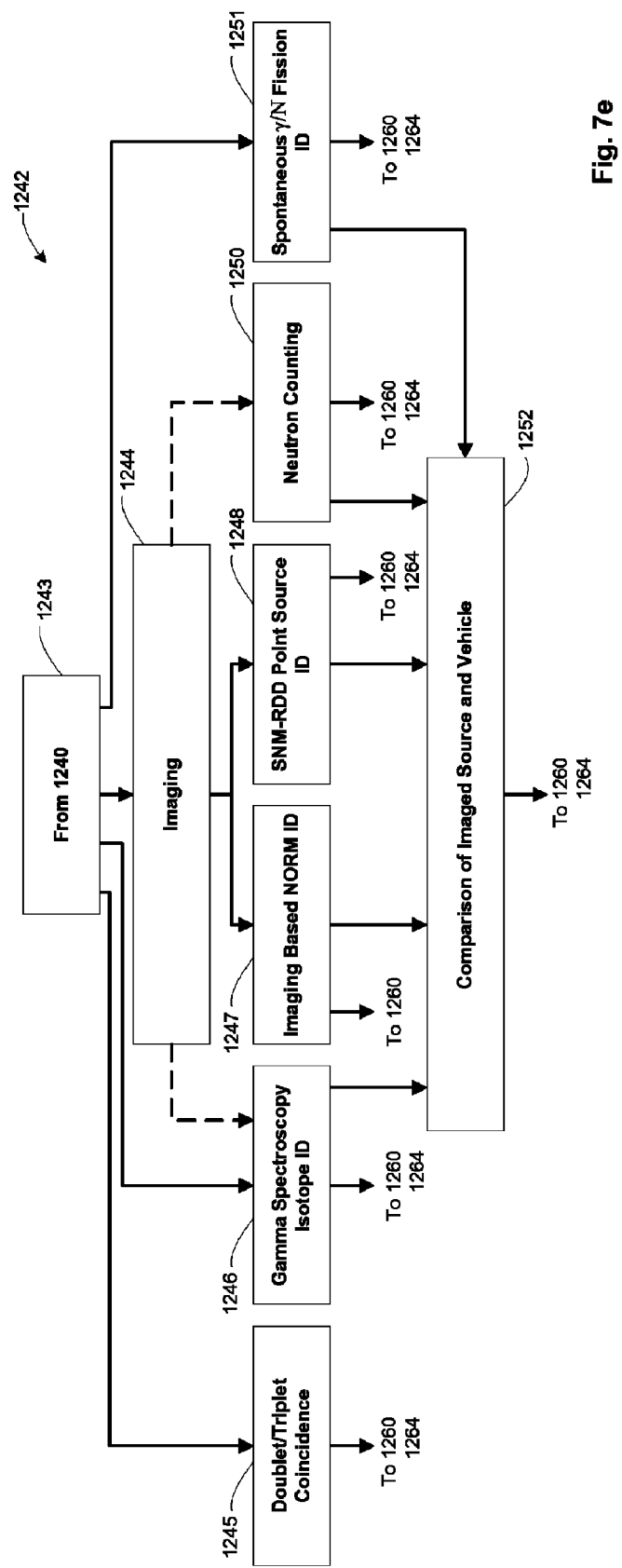

FIG. 7A is an overall, simplified flow chart of a method 1200. In the illustrated method, a plurality of signals from each PMT 212 is acquired, for example, using the circuitry of FIG. 8 US Publication 2006/0289775. This acquisition is explained more fully below with reference to FIG. 12B thereof. The individual PMT data is stored (1210) and signals are corrected and paired (1212) to reconstruct the characteristics of each scintillation event. This process is described more fully with respect to FIG. 12C thereof. Data for each scintillation is stored (1220).

The stored data is grouped by incident particles which are reconstructed and individually analyzed (1222). This process is described more fully with the aid of FIG. 7D. The individual particle data is then stored (1240).

The incident particle data is analyzed to determine one or more "signatures" (1242) characteristic of SNM, RDD and NORM and/or their isotopes. This is discussed more fully with respect to FIG. 7E.

Based on the individual signatures, a determination is as to whether a threat is present (1260). If a threat is identified with a high probability (e.g. >5σ), then an alarm is generated (1262). If multimodal analysis is available, then such analysis (1264), as described further below, is performed. If it is not available, then 1260, 1262 are replaced by 1280, 1282, 1284 and 1286, described immediately below. It should be noted that if multi-modal analysis is available, then it is usually performed before any alarm is sounded to verify the single modality determination and to reduce false alarms.

After multi-modal analysis, (and more preferably a plurality of multi-mode analyses) a threat assessment (1280) is performed. If the multi-modal threat probability is above a certain threshold, then an alarm is generated (1282), If it is below a second, lower threshold, then the vehicle/object being tested is cleared (1284). If it is between the two thresholds, then the vehicle/package is sent for further manual or machine testing (1286).

Returning to 1202, reference is made to FIG. 7B, which is a simplified flow chart of the processes of single PMT signal acquisition. At 1204 the signal is identified as a signal and given a time stamp. The signal is acquired (1206) and digitized (1208). In an embodiment of the invention, the circuitry of FIG. 8 of US Publication 2006/0289775 is used to acquire the signals.

Returning to 1212, reference is made to FIG. 7C, which is a simplified block diagram of the process of reconstructing the characteristics of individual scintillations from the separate signals of the PMTs. The data in the PMT raw database is corrected in accordance with the correction factors described above. The time stamp is corrected (1214) for each scintillation, according to the time delay correction described above. Then, the PMT signals are paired (1215) and associated with a given detector based on the time stamp (i.e., the signals have a time stamp within the maximum corrected time for signals from PMTs of the same segment). The energy signal (sum of the energy deposited signals indicated by each PMT) of the signals preferably corrected by the loci dependent light correction efficiency correction described above is determined (1216) and identified as the energy signal of the scintillation. The position of the scintillation, along the length of the segment is determined (1217) based on the one or both of the energy difference between the paired PMT signals or the difference between their corrected time stamps (difference between TOFs). In addition, the determination of whether the scintillation is caused by an interaction with a gamma or a neutron, is optionally determined (1218) by the decay time constants or shape difference of the signals. It is well known in the art that in OS, the neutron caused scintillation decay is substantially longer than that caused by a gamma. The information on the scintillations is sent for storage (1220, FIG. 7A) in a scintillation database.

Returning to 1222, FIG. 7D is a simplified block diagram of the process of single incident particle analysis and reconstruction.

First, the scintillations are grouped (1221) in accordance with their time stamps as scintillations that are generated by a single incident gamma or neutron. In practice, all scintillations that occur with a window of −10 nanosec and +20 nanosec of the "first" scintillation are considered as part of the same group, so long as they are geometrically close (e.g., closer than 1 meter apart). Since the time between incident particles is much larger than the time between scintillations, there is only a small chance of overlap of scintillations from different incident particles. In the event that there is such overlap, this in itself could be indicative of a cascaded event, spontaneous fission salvo or an RDD or of a very large unshielded source.

Once the scintillations have been grouped, the total energy (1232) transferred from the incoming event can be determined by summing the individual energy signals of the scintillations in the group.

Separately from the energy determination, the scintillations are sequenced (1223) based on their corrected time stamps. A time stamp for the incident radiation is determined as the first of the sequence of scintillations (1224) and its position of incidence is determined (1225) from the position along the segment as described above (for y) and by the segment in which it appears (x, z).

The sequence is optionally traced (1226) through the detector to determine its path. This path is optionally used to determine (1227) a gross direction of incidence. Depending on the energy, this gross direction can be used for rejecting (1228, 1229) events that are from terrestrial or sky sources and those that enter the detector from the sides other than the front face. For higher energy gamma, for which the scatter is relatively low, the gross direction becomes sharper and may be useful for imaging as well. Alternatively or additionally where collimation is available, a direction of incidence can be derived for one or both of gammas and neutrons, depending on the type and configuration of the collimation as described above.

Furthermore, using the principles described above, some of the events can be classified as having escape quanta (1230) and are either rejected for energy spectroscopic applications or alternatively their escape quanta energy is estimated, and this estimate is further used to calculate the incident particle total energy. The estimated total energy is given a probability factor which is used for spectroscopic and other particle energy dependent decisions (1231). The particle is then characterized (1233) by (1) its time of incidence; (2) its x, y incident coordinates; (3) its direction of incidence, if available; (4) whether it is a neutron or a gamma; and (5) its energy (if a gamma). This information is sent to 1240 for storage.

Returning to 1240, FIG. 7E is a simplified block diagram of actions performed in single modality threat detection. It is noted that different detector configurations are generally needed for optimizing these single modalities. For example, if collimation is used, the event capture efficiency is reduced and the gamma spectroscopy and coincidence (doublet, triplet and γ/N coincidence) signature detection are degraded. On the other hand, when collimation is used the ability to determine where the threat is in the vehicle and whether it is a small source (and thus more probably an SNM or RDD) is enhanced. Thus, it may be useful to have more than one detector each with different capabilities. A second detector can be used to screen all of the vehicles/packages or only those that look suspicious when they pass the first detector.

First, information on reconstructed events that are stored is retrieved (1243). To the extent possible (depending on the detector capabilities) related events (for example gammas with a same energy or neutrons) are optionally imaged (1244).

Using the information that is stored in 1240 the following signature/analyses are possible: doublet/triplet coincidence (1245); gamma spectroscopy isotope ID (with or without imaging and on the entire detector or vehicle or only in the area of a possible threat) (1246); image based NORM ID to identify the NORM signature (1247); SNM-RDD "point" source ID (based on the understanding that threats are generally less than 0.5 meters in extent) (1248); neutron counting/imaging (1250); and spontaneous fission γ/N ID, based on the temporal coincidence of a gamma and/or neutron events (1251). When a modality produces an image, then this image can be superimposed on an optical image of the vehicle (1252). All of the generated analyses are sent to a single modality alarm (1260) which compares the level of the individual threats probability and determines if an alarm should be generated based on only a singe threat. These single modality analyses are then subject to multi-modal analysis 1264. It is well known in the art of statistics (and in particular in threat analysis) that probability of detection false alarm or overlooked threat rates can be significantly reduced when information from orthogonal sources (or semi-orthogonal sources) are available. Any of the techniques available in the art would appear to be suitable for the present multi-modal analysis. Some of the multimodal analyses include:

image guided gamma spectroscopic SNM-RDD ID;

closed circuit TV image of the object coupled with other signals or images;

combined Neutron counting and gamma spectroscopy ID;

doublet detection and Gamma Spectroscopy SNM-RDD-NORM ID;

doublet detection and imaging SNM-RDD-NORM ID; and fused nuclear and gamma imaging.

Although the detectors are described in the context of threat detection of SNM-RDD devices and radioactive materials carried on vehicles, in some embodiments the large OS detectors are used to screen supply chain articles (e.g. containers, pallets, air cargo, mail bags, etc.)

While not described explicitly, corrections known in the art, such as background correction, can be applied in portals using detectors of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method of improving energy determination of a Gamma particle which interacts with a segmented scintillation detector, the method comprising: identifying gamma particles detected by the detector that are likely not to have deposited their full energy in the detector, based only on characteristics of said detected events; and treating the identified radiation gamma particles differently from other radiation events that are likely to have deposited their full energy in the detector.

2. A method according to claim 1 wherein identifying comprises determining the number of scintillations caused by a detected gamma particle.

3. A method according to claim 2 wherein treating the identified gamma particles differently comprises rejecting gamma particles causing a number of scintillations below a threshold number.

4. A method according to claim 1 wherein treating the identified gamma particles differently comprises rejecting gamma particles causing a number of scintillations below a threshold number.

5. A method according to claim 1 wherein identifying gamma particles comprises estimating a position and time of scintillations caused by said interactions.

6. A method according to claim 5 wherein identifying is responsive to one or more characteristics chosen from the group consisting of (a) the number of scintillations associated with a given gamma particle;
(b) the distance of a final scintillation associated with or resulting from a given gamma particle from a boundary of the detector; or (c) the time duration of a series of scintillations resulting from an gamma particle.

7. A method according to claim 6 wherein the gamma particle is rejected if the number of scintillations is below a given number.

8. A method according to claim 7 wherein identifying is responsive to at least two of (a) (b) or (c).

9. A method according to claim 7 wherein identifying is responsive to all of (a), (b) and (c)

10. A method according to claim 6 wherein identifying is responsive to at least two of (a), (b) or (c).

11. A method according to claim 6 wherein identifying is responsive to all of (a), (b) and (c).

12. A method according to claim 6 wherein identifying comprises determining a probability factor associated with each of (a), (b) and (c) and weighting the probability factors associated with each of said characteristics to provide a weighted score.

13. A method according to claim 12 wherein treating differently comprises rejecting gamma particles having a weighted score below a given threshold.

14. A method according to claim 12 wherein treating differently comprises estimating the energy of said gamma particles and utilizing said particles with the estimated energy to form an energy spectrum.

15. A method according to claim 8 wherein identifying comprises determining a probability factor associated with at least said two of (a), (b) and (c) and weighting the probability factors associated with each of said two characteristics to provide a weighted score.

16. A method according to claim 15 wherein treating differently comprises rejecting gamma particles having a weighted score below a given threshold.

17. A method according to claim 15 wherein treating differently comprises estimating the energy of said gamma particles and utilizing said gamma articles with the estimated energy to form a spectrum.

18. A method according to claim 10 wherein identifying comprises determining a probability factor associated with at least said two of (a), (b) and (c) and weighting the probability factors associated with each of said two characteristics to provide a weighted score.

19. A method according to claim 18 wherein treating differently comprises rejecting gamma particles having a weighted score below a given threshold.

20. A method according to claim 18 wherein treating differently comprises estimating the energy of said gamma particles and utilizing said gamma particles with the estimated energy to form an energy spectrum.

21. A method according to claim 9 wherein identifying comprises determining a probability factor associated with at all of (a), (b) and (c) and weighting the probability factors associated with each of said characteristics to provide a weighted score.

22. A method according to claim 21 wherein treating differently comprises rejecting gamma particles having a weighted score below a given threshold.

23. A method according to claim 21 wherein treating differently comprises estimating the energy of said gamma particles and utilizing said gamma particles with the estimated energy to form an energy spectrum.

24. A method according to claim 1 wherein the scintillator is an organic scintillator.

25. A method according to claim 1 wherein the segmented scintillation detector comprises a plurality of scintillator segments situated side by side and wherein the gamma particle is incident on a long side of the scintillator.

26. A method of improving energy determination of an incoming radiation particle which interacts with a segmented scintillation detector, the method comprising:
    identifying incoming radiation particles interacting with and detected by the detector that are likely not to have deposited their full energy in the detector, based only on characteristics of said detected particles; and
    treating the identified incoming radiation particles differently from other radiation events that are likely to have deposited their full energy in the detector.

27. A method according to claim 26 wherein the segmented scintillation detector comprises a plurality of scintillator segments situated side by side and wherein the gamma particle is incident on a long side of the scintillator.

28. A method according to claim 27 wherein treating the identified particles differently comprises rejecting particles causing a number of scintillations below a threshold number.

29. A method according to claim 27 wherein identifying events comprises estimating a position and time of scintillations caused by said interactions.

30. A method according to claim 29 wherein identifying is responsive to one or more characteristics chosen from the group consisting of (a) the number of scintillations associated with or resulting from a given incoming particle; (b) the distance of a final scintillation associated with a given particle from a boundary of the detector; or (c) the time duration of a series of scintillations resulting from a particle.

31. A method according to claim 27 wherein identifying is responsive to at least two of (a) (b) or (c).

32. A method according to claim 27 wherein identifying is responsive to all of (a), (b) and (c)

33. A method according to claim 32 wherein identifying comprises determining a probability factor associated with each of (a), (b) and (c) and weighting the probability factors associated with each of said characteristics to provide a weighted score.

34. A method according to claim 33 wherein treating differently comprises rejecting gamma particles having a weighted score below a given threshold.

35. A method according to claim 31 wherein identifying comprises determining a probability factor associated with at least said two of (a), (b) and (c) and weighting the probability factors associated with each of said two characteristics to provide a weighted score.

36. A method according to claim 26 wherein the scintillator is an organic scintillator.

37. A method of improving energy determination of a Gamma event which interacts with a segmented scintillation detector, the method comprising:
    identifying radiation events detected by a detector that are likely not to have deposited their full energy in the detector, based only on characteristics of said detected events; and
    treating the identified radiation events differently from other radiation events that are likely to have deposited their full energy in the detector,
    wherein identifying comprises:
        estimating a position and time of scintillations caused by said interactions; and
        the distance of a final scintillation associated with a given radiation event from a boundary of the detector.

38. A method according to claim 1 and including identifying nuclear interactions with the detector based on the characteristics of the scintillations generated by the particle.

39. A method according to claim 38 wherein interactions that are the result of interaction with a nuclear particle are identified as such when the number of segments in which scintillations occur is one or two and when the shape of the scintillations is characteristic of interactions with nuclear particles.

40. A method of discriminating a Gamma event which interacts with a segmented scintillation detector from nuclear particles which interact with the segmented scintillation detector, the method comprising:
    determining a number of detector segments within scintillations are generated as a result of an incoming particle;
    determining the shape of the scintillations generated;
    provisionally classifying the incoming particle as a gamma particle based on the number of detector segments and the shape of the scintillations;
    identifying incoming provisionally classified particles whose scintillation characteristics indicate that they have not deposited all of their energy in the detector by one or both of:(a) the distance of a final scintillation associated with or resulting from a given gamma particle from a boundary of the detector; and (d) the time duration of a series of scintillations resulting from an gamma particle.

41. A method according to claim 40 and including identifying interactions that are the result of interaction with a nuclear particle when the number of segments in which scintillations occur is one or two and when the shape of the scintillations is characteristic of interactions with nuclear particles.

* * * * *